US012739863B2

(12) United States Patent
Babaei

(10) Patent No.: US 12,739,863 B2
(45) Date of Patent: Sep. 15, 2026

(54) CAPABILITY SIGNALING FOR DYNAMIC SPECTRUM SHARING

(71) Applicant: Alireza Babaei, Fairfax, VA (US)

(72) Inventor: Alireza Babaei, Fairfax, VA (US)

(73) Assignee: Alireza Babaei, Fairfax, VA (US)

( * ) Notice: Subject to any disclaimer, the term of this patent is extended or adjusted under 35 U.S.C. 154(b) by 473 days.

(21) Appl. No.: 18/139,180

(22) Filed: Apr. 25, 2023

(65) Prior Publication Data

US 2023/0354391 A1 Nov. 2, 2023

Related U.S. Application Data

(60) Provisional application No. 63/335,679, filed on Apr. 27, 2022.

(51) Int. Cl.

*H04W 72/51* (2023.01)
*H04W 72/1263* (2023.01)
*H04W 72/232* (2023.01)

(52) U.S. Cl.

CPC ....... *H04W 72/51* (2023.01); *H04W 72/1263* (2013.01); *H04W 72/232* (2023.01)

(58) Field of Classification Search

CPC ............... H04W 72/51; H04W 72/232; H04W 72/1263; H04W 8/22; H04W 8/24; H04W 88/06; H04L 5/0053; H04L 5/0091; H04L 5/0048

See application file for complete search history.

(56) References Cited

U.S. PATENT DOCUMENTS

2022/0046449 A1* 2/2022 Dhanda ................. H04W 24/10
2022/0217669 A1* 7/2022 Bai ......................... H04W 8/24
2022/0377574 A1* 11/2022 Horn .................... H04B 7/0691
2023/0239091 A1* 7/2023 Park ...................... H04L 5/0053 370/329
2023/0239872 A1* 7/2023 Ly ........................ H04B 7/0691 370/329
2023/0319865 A1* 10/2023 Xu ...................... H04W 72/542 370/329
2024/0080132 A1* 3/2024 Atawia ................. H04L 5/0094

OTHER PUBLICATIONS

NPL Document, “On DSS enhancements in Rel-18” Dec. 6-17, 2021 (Year: 2021).*

3GPP TS 38.211 V17.1.0 (Mar. 2022); Technical Specification; 3rd Generation Partnership Project; Technical Specification Group Radio Access Network; NR; Physical channels and modulation; (Release 17).

3GPP TS 38.212 V17.1.0 (Mar. 2022); Technical Specification; 3rd Generation Partnership Project; Technical Specification Group Radio Access Network; NR; Multiplexing and channel coding; (Release 17).

(Continued)

*Primary Examiner* — Mewale A Ambaye

(74) *Attorney, Agent, or Firm* — Alireza Babaei

(57) ABSTRACT

A wireless device may transmit capability IE(s) indicating that the wireless device supports reception of a downlink control channel, of a second radio access technology, in resource element(s) associated with a reference signal of a first radio access technology. The wireless device may receive, in response to transmitting the capability IE(s), the downlink control channel in the resource element(s).

20 Claims, 24 Drawing Sheets

Receive configuration parameter(s) indicating/enabling receiving a downlink control channel, of a 2nd RAT, in RE(s) associated with a 1st RS of a 1st RAT

2410

Receive, based on the configuration parameter(s) and in/using the RE(s) of the 1st RS, the downlink control channel associated with the 2nd RAT

2420

(56) References Cited

OTHER PUBLICATIONS

3GPP TS 38.213 V17.1.0 (Mar. 2022); Technical Specification; 3rd Generation Partnership Project; Technical Specification Group Radio Access Network; NR; Physical layer procedures for control; (Release 17).
3GPP TS 38.214 V17.1.0 (Mar. 2022); Technical Specification; 3rd Generation Partnership Project; Technical Specification Group Radio Access Network; NR; Physical layer procedures for data; (Release 17).
3GPP TS 38.300 V17.0.0 (Mar. 2022); Technical Specification; 3rd Generation Partnership Project; Technical Specification Group Radio Access Network; NR; NR and NG-RAN Overall Description; Stage 2; (Release 17).
3GPP TS 38.321 V17.0.0 (Mar. 2022); Technical Specification; 3rd Generation Partnership Project; Technical Specification Group Radio Access Network; NR; Medium Access Control (MAC) protocol specification; (Release 17).
3GPP TS 38.331 V17.0.0 (Mar. 2022); Technical Specification; 3rd Generation Partnership Project; Technical Specification Group Radio Access Network; NR; Radio Resource Control (RRC); Protocol specification; (Release 17).
3GPP TSG RAN Meeting #94e; RP-212730; Electronic Meeting, Dec. 6-17, 2021 (revision of RP-21xxxx); Source: RAN4 Chair (Huawei); Title: New WI: Enhancement of NR Dynamic spectrum sharing (DSS); Document for: Approval Agenda Item: 8A.4.
3GPP TSG RAN Meeting #94-e; RP-212911; Electronic Meeting, Dec. 6-17, 2021; Source: Intel Corporation; Title: Discussion on scope of Rel-18 DSS enhancements; Agenda item: 8A.1; Document for: Discussion and Decision.
3GPP TSG-RAN Meeting #94-e; RP-212946; eMeeting, Dec. 6-17, 2021; Source: Ericsson; Title: On DSS enhancements in Rel-18; Agenda Item: 8A.1; Document for: Discussion and Decision.
3GPP TSG RAN Meeting #94-e; RP-213205; Electronic Meeting, Dec. 6-17, 2021; Agenda Item: 8.6.1; Source: CMCC; Title: Discussion on WID on enhancement of NR Dynamic spectrum sharing (DSS); Document for: Discussion.
3GPP TSG RAN Meeting #94-e; RP-213392; Electronic Meeting, Dec. 6-17, 2021; Source: ZTE, China Telecom; Title: Discussion on Rel-18 NR DSS enhancement; Agenda item: 8A.1; Document for: Discussion/Decision.
3GPP TSG RAN Meeting #94e; RP-213559; Electronic Meeting, Dec. 6-17, 2021; Source: Ericsson; Title: New WI: Enhancement of NR Dynamic spectrum sharing (DSS); Document for: Approval; Agenda Item: 8A.1.
3GPP TSG RAN Meeting #94e; RP-213575; Electronic Meeting, Dec. 6-17, 2021; Source: Ericsson; Title: New WI: Enhancement of NR Dynamic spectrum sharing (DSS); Document for: Approval; Agenda Item: 8A.1.
3GPP TSG-RAN Meeting #94-e; Tdoc RP-21xxxx; Electronic Meeting, Dec. 6-17, 2021; Agenda Item: 8A.1; Source: Ericsson; Title: Moderator's summary of discussion [94e-11-R18-DSS]; Document for: Information.

* cited by examiner

100
Wireless Device 102
Radio Access Network 104
Core Network 106
External Network(s)

110
UE 112A
UE 112B
UEs 112
Uu
Uu
gNB 122A
gNB 122B
ng-eNB 124A
ng-eNB 124B
Xn
NG
NG-RAN 120
AMF 132
UPF 134
5G-CN 130
External Network(s)

FIG. 4

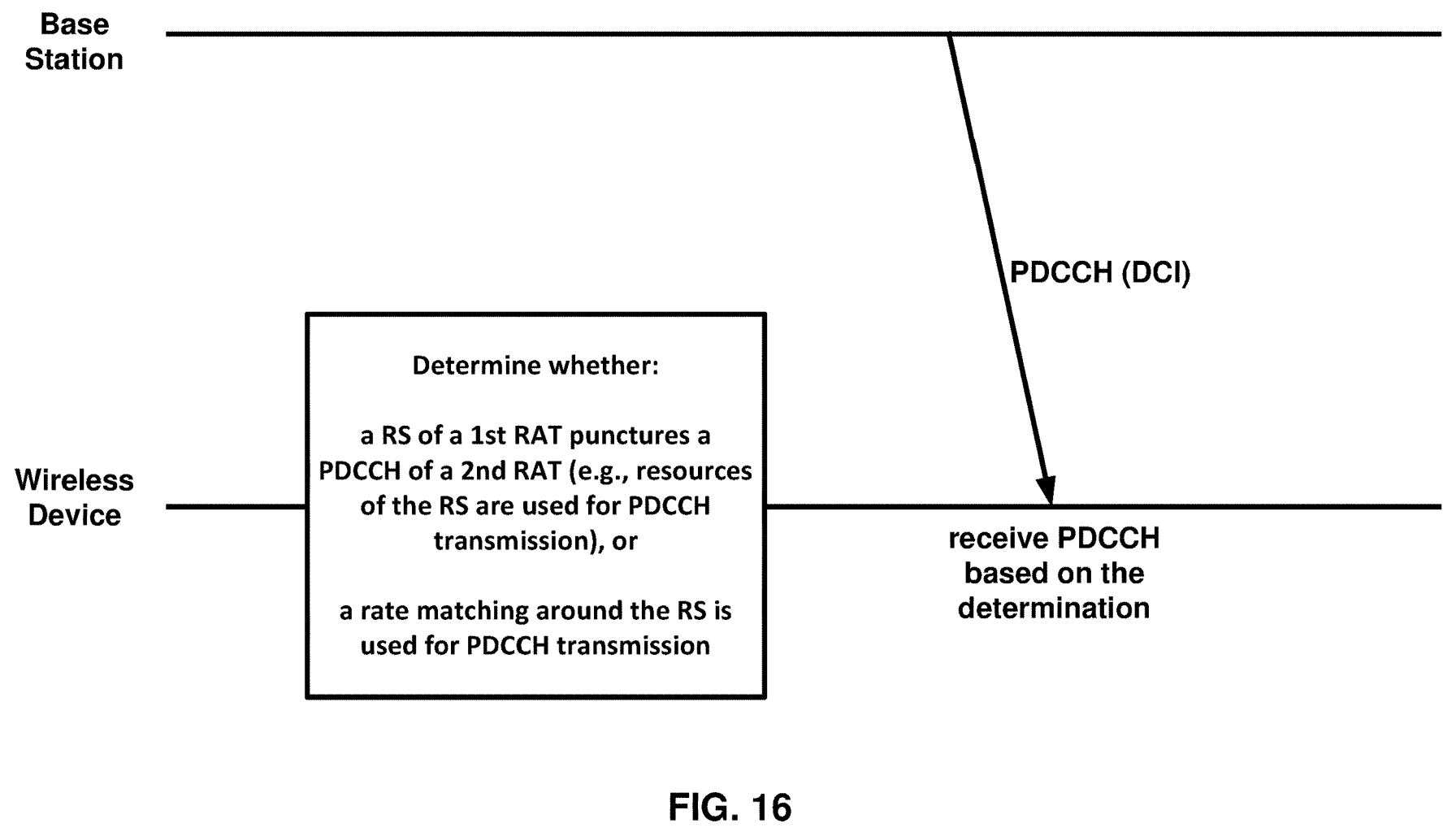

Base Station

Wireless Device

PDCCH (DCI)

receive PDCCH based on the determination

Determine whether:

a RS of a 1st RAT punctures a PDCCH of a 2nd RAT (e.g., resources of the RS are used for PDCCH transmission), or a rate matching around the RS is used for PDCCH transmission

FIG. 16

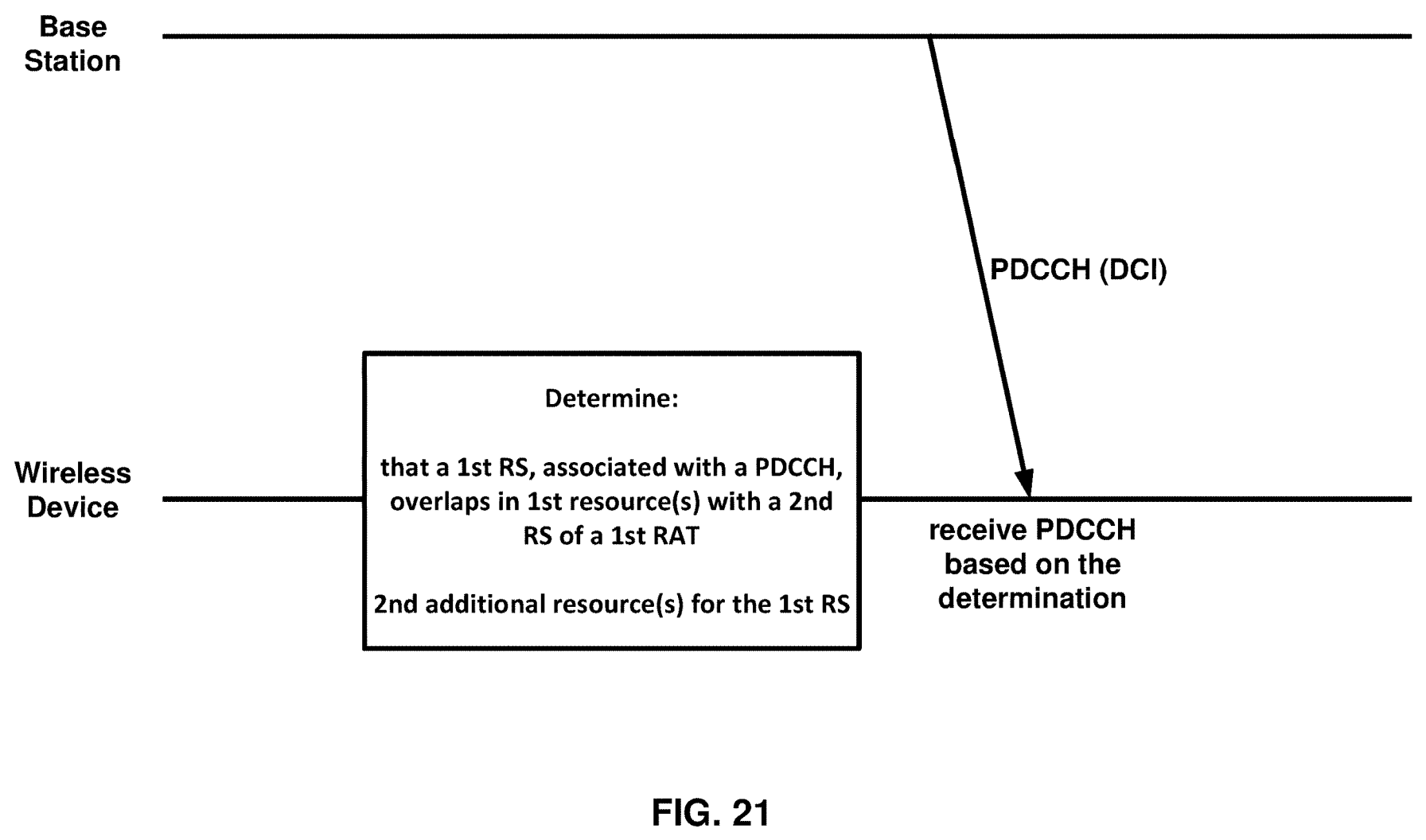

Base Station

Wireless Device

PDCCH (DCI)

receive PDCCH based on the determination

Determine:

that a 1st RS, associated with a PDCCH, overlaps in 1st resource(s) with a 2nd RS of a 1st RAT 2nd additional resource(s) for the 1st RS

FIG. 21

Figure 23:
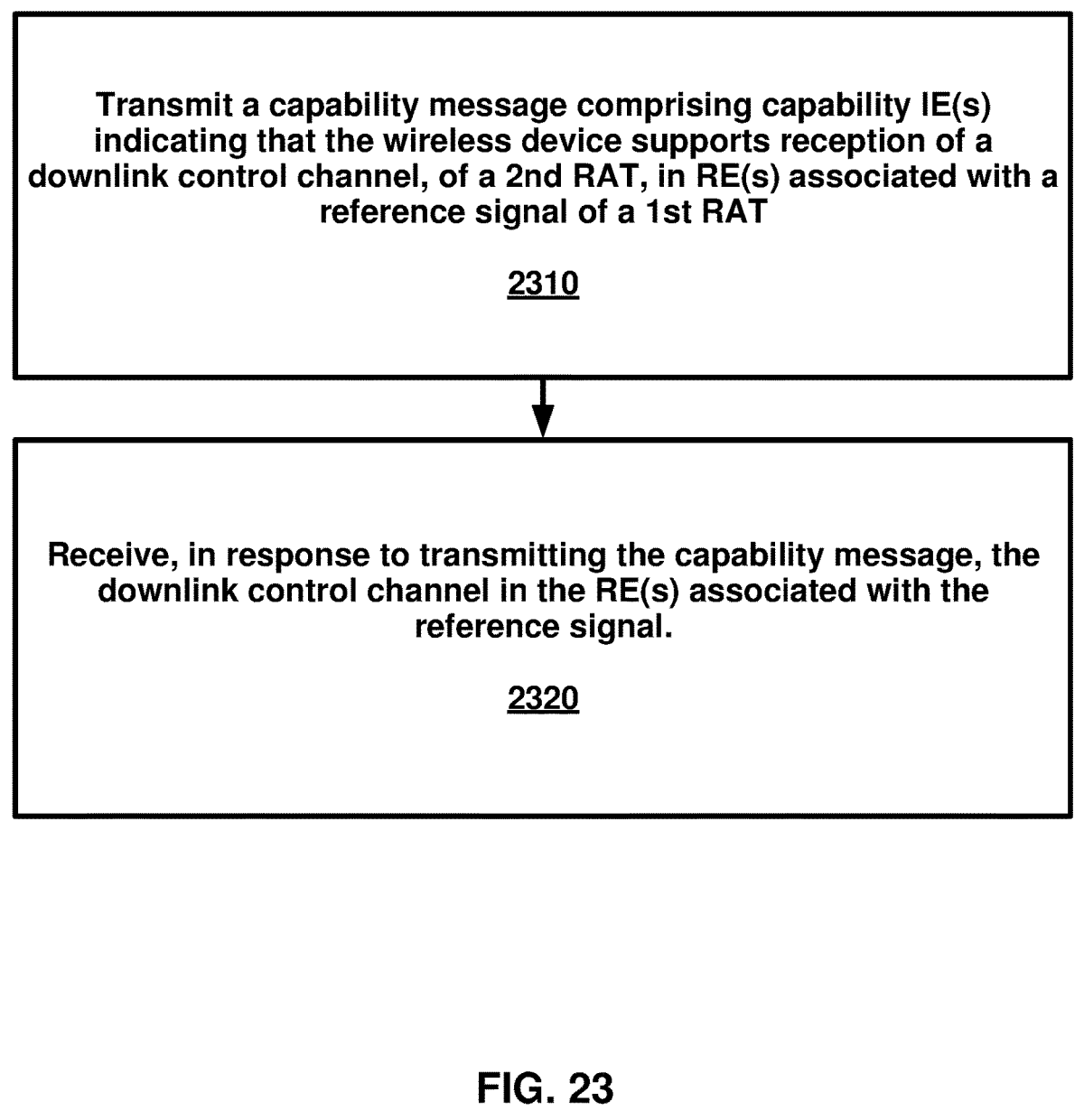

Transmit a capability message comprising capability IE(s) indicating that the wireless device supports reception of a downlink control channel, of a 2nd RAT, in RE(s) associated with a reference signal of a 1st RAT

2310

Receive, in response to transmitting the capability message, the downlink control channel in the RE(s) associated with the reference signal.

Figure 24:
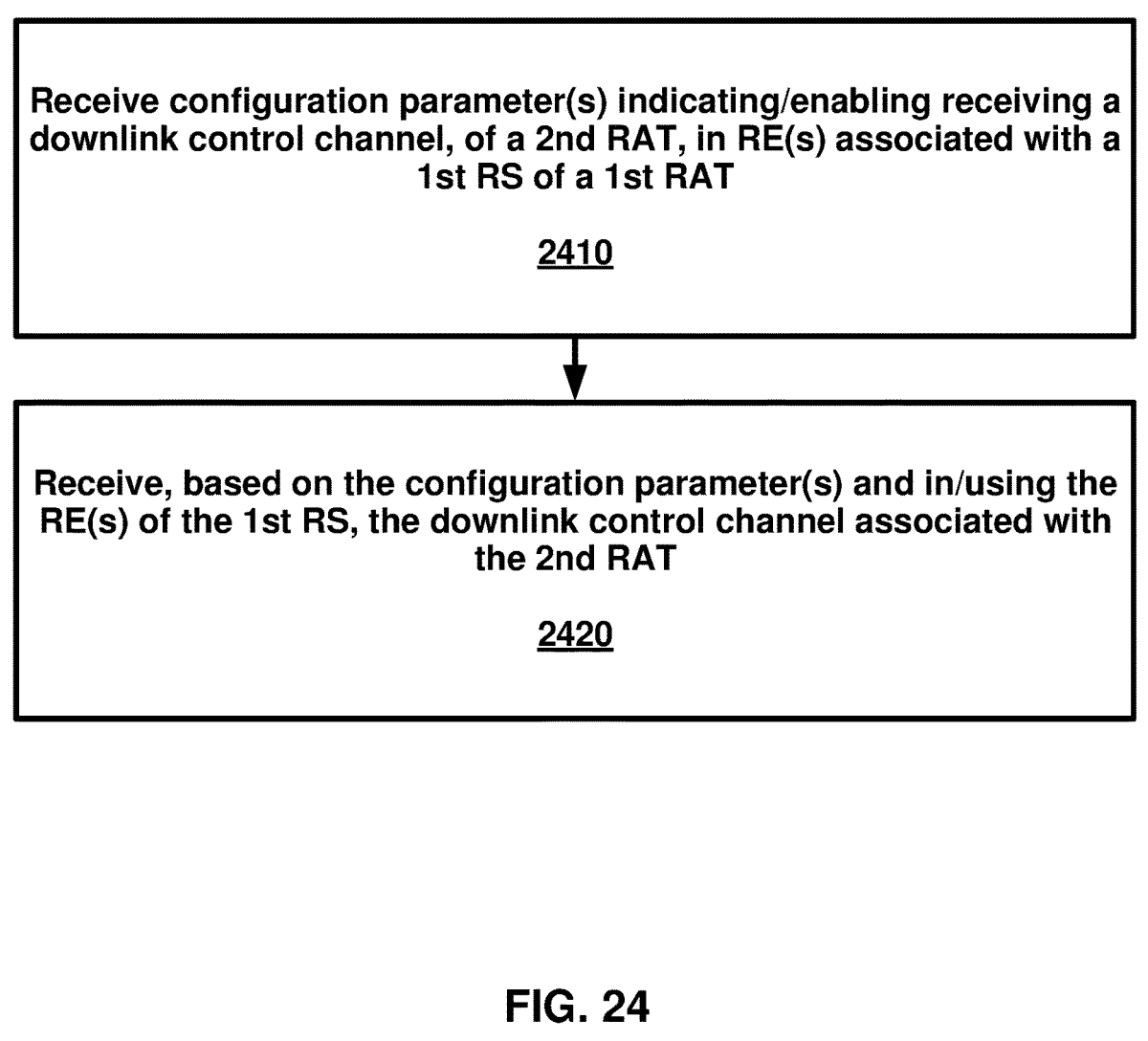

Receive configuration parameter(s) indicating/enabling receiving a downlink control channel, of a 2nd RAT, in RE(s) associated with a 1st RS of a 1st RAT

2410

Receive, based on the configuration parameter(s) and in/using the RE(s) of the 1st RS, the downlink control channel associated with the 2nd RAT

CAPABILITY SIGNALING FOR DYNAMIC SPECTRUM SHARING

CROSS-REFERENCE TO RELATED APPLICATIONS

This application claims the benefit of U.S. Provisional Application No. 63/335,679, filed Apr. 27, 2022, which is hereby incorporated by reference in its entirety.

BRIEF DESCRIPTION OF THE DRAWINGS

FIG. 4 shows example flow of packets through the protocol layers in accordance with several of various embodiments of the present disclosure.

FIG. 16 shows an example process in accordance with several of various embodiments of the present disclosure.

FIG. 21 shows an example process in accordance with several of various embodiments of the present disclosure.

FIG. 23 shows an example flow diagram in accordance with several of the various embodiments of the present disclosure.

FIG. 24 shows an example flow diagram in accordance with several of the various embodiments of the present disclosure.

DETAILED DESCRIPTION

The exemplary embodiments of the disclosed technology enhance the processes in a wireless device and/or one or more base stations for dynamic spectrum sharing between multiple radio access technologies (RATs). The exemplary disclosed embodiments may be implemented in the technical field of wireless communication systems. More particularly, the embodiments of the disclosed technology enhance reception of downlink control channel, associated with a radio access technology (RAT), in case of an overlap with a signal associated with a different RAT.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figures 1A, 1B:
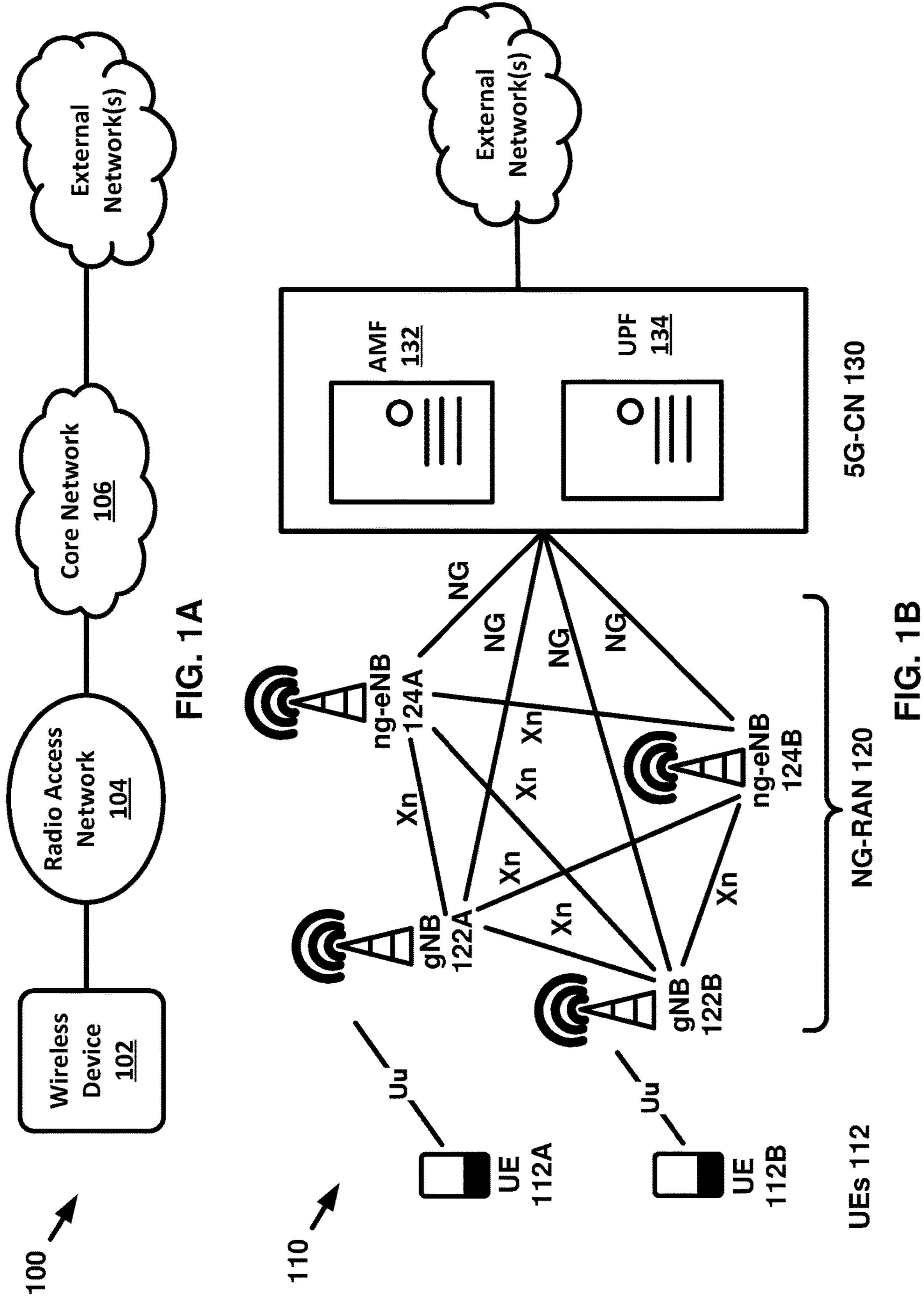
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone operation, the 5G NR gNB is connected to a 5G-CN and the user plane and the control plane functionalities are provided by the 5G NR gNB.

Figure 2A:
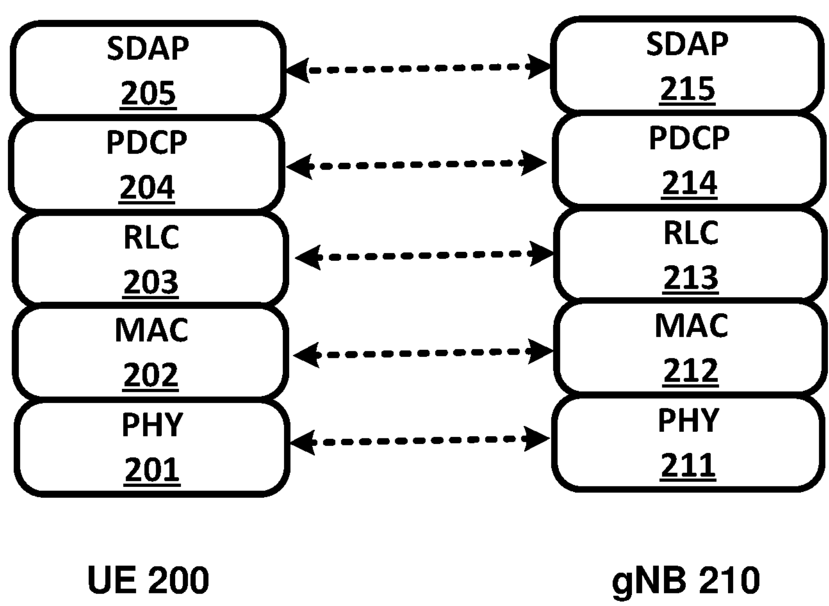
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
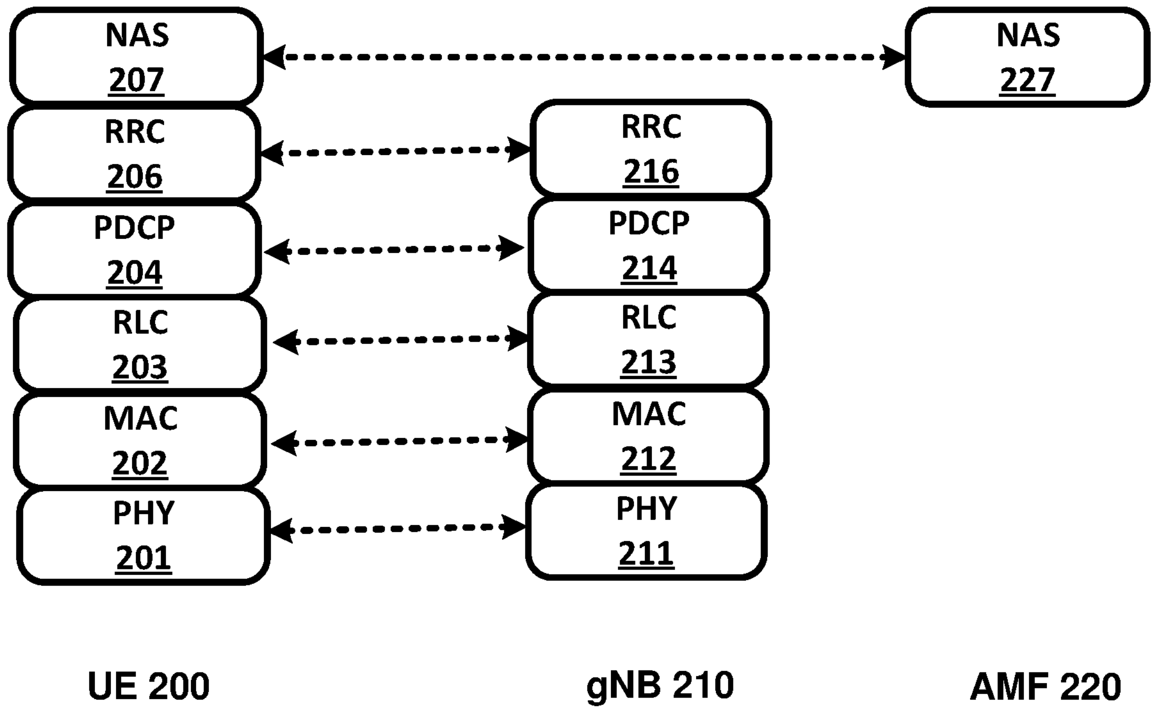

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
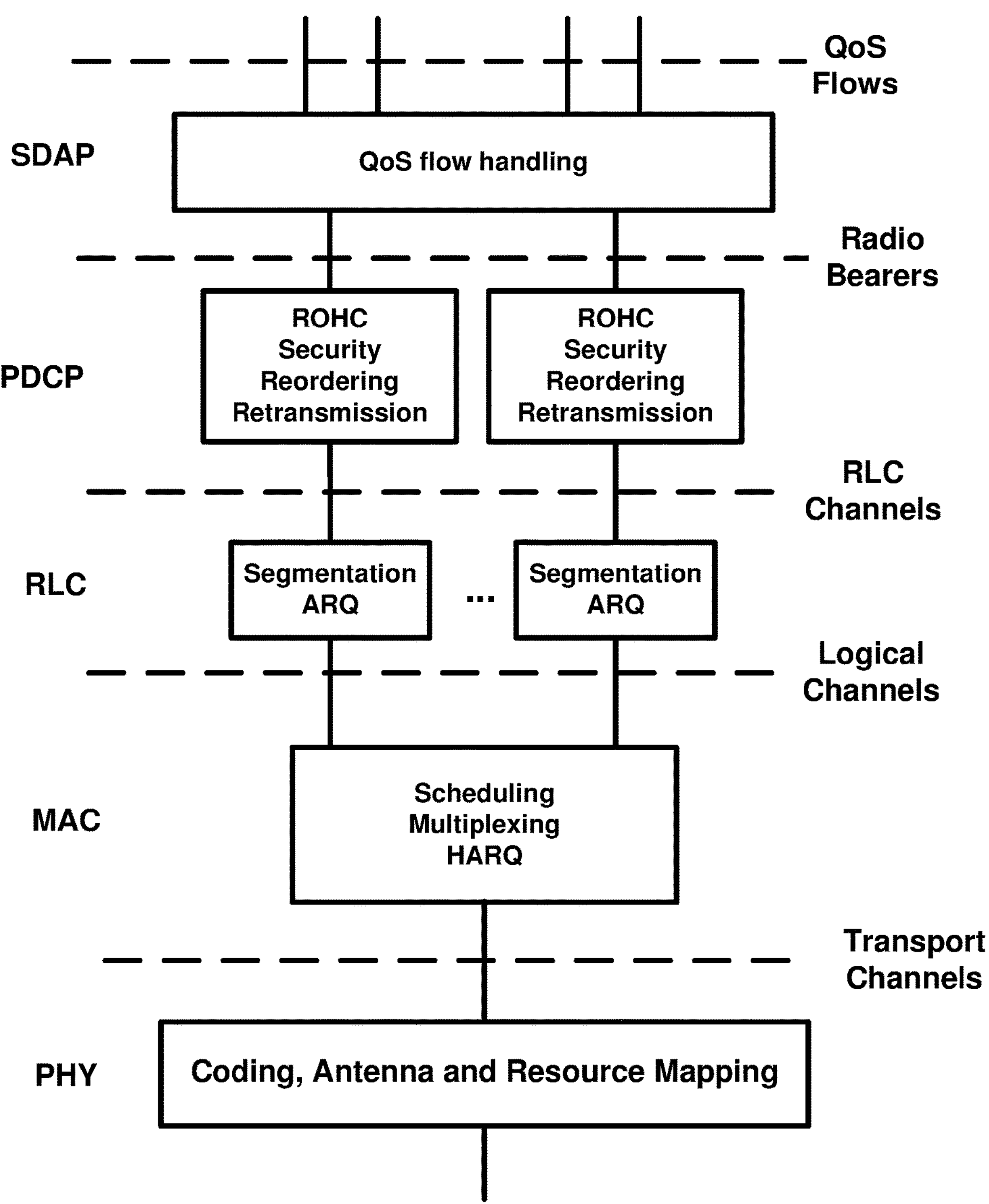
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
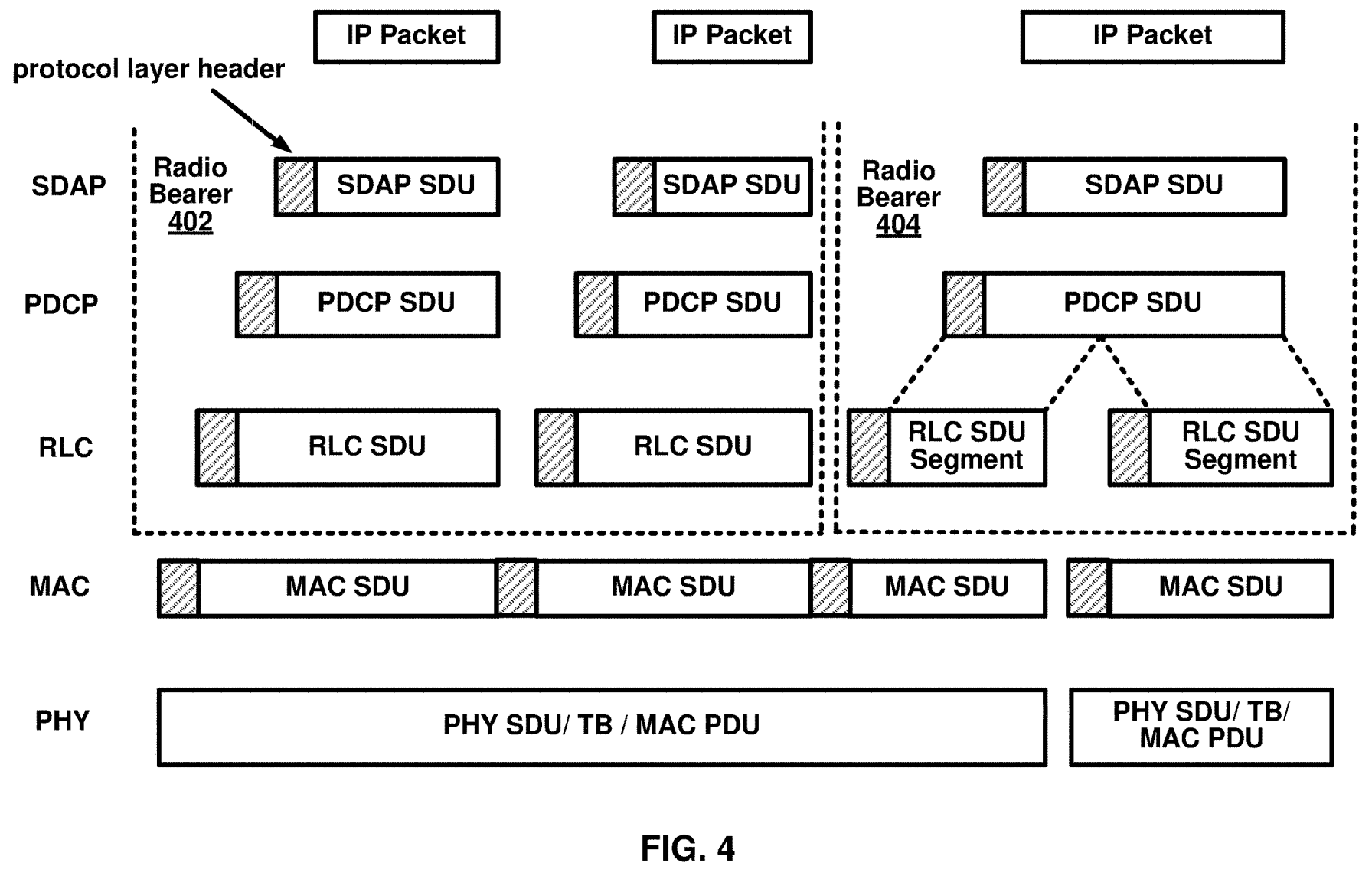

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
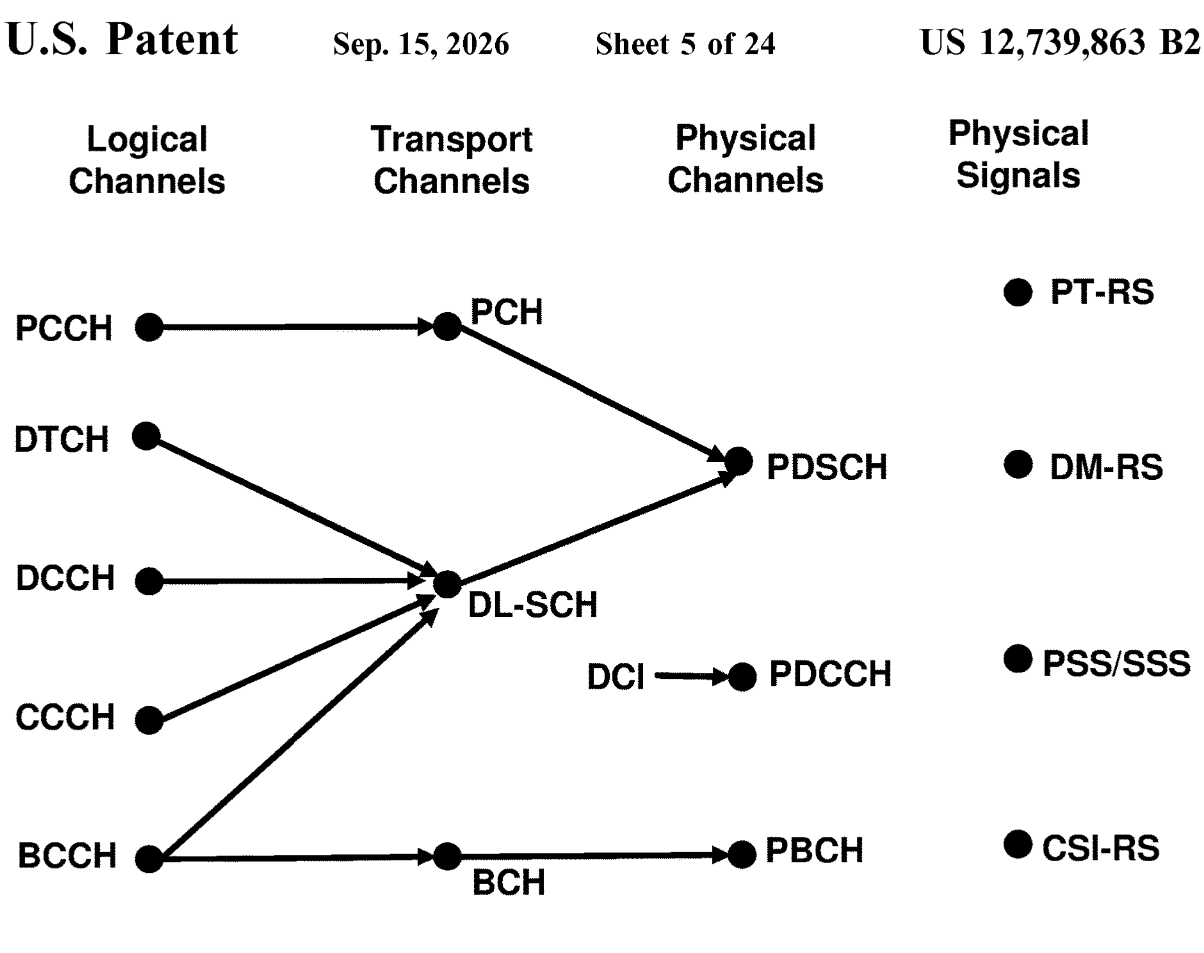
FIG. 5A shows example mapping of channels between layers of the protocol stack and different physical signals in downlink in accordance with several of various embodiments of the present disclosure.
Figure 5B:
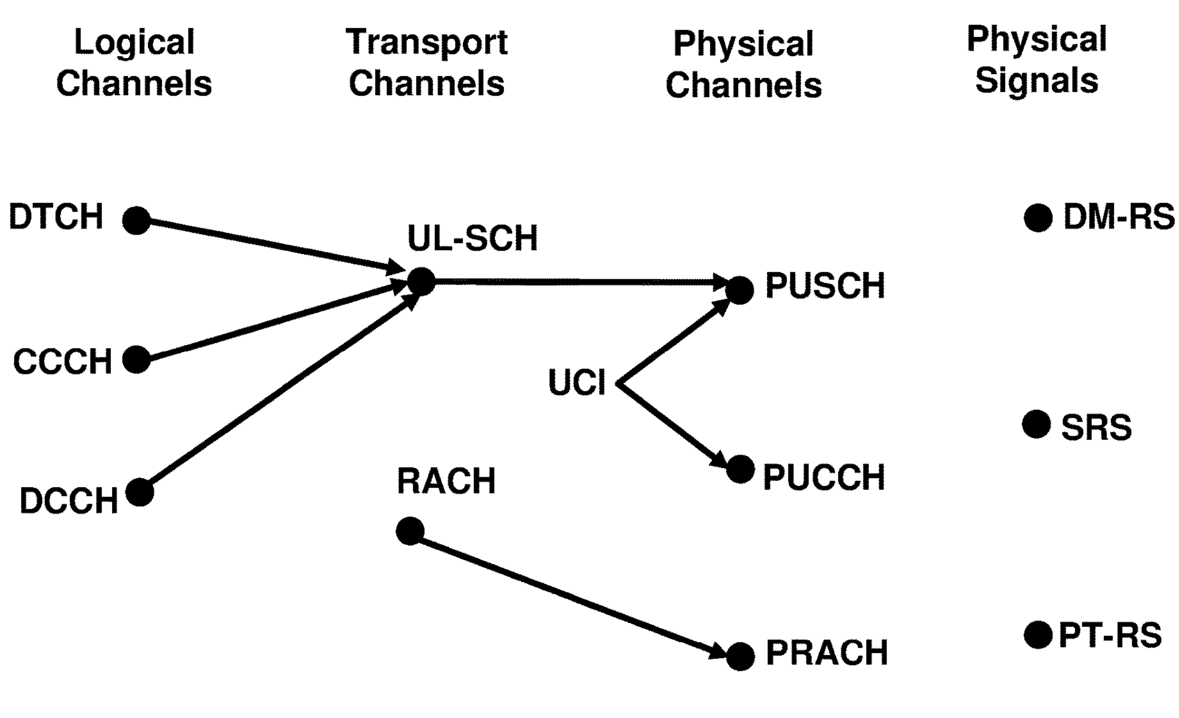
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
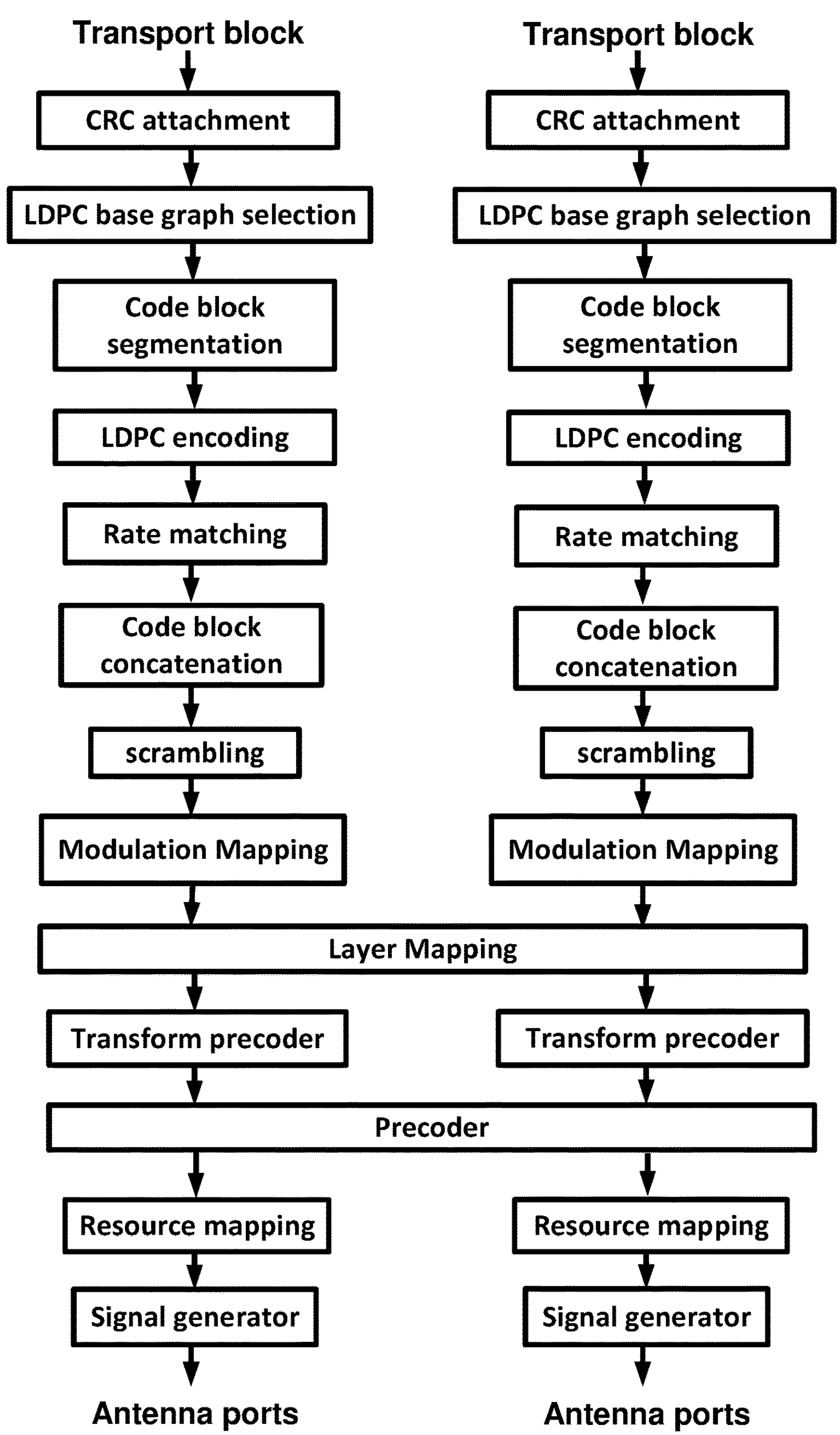
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
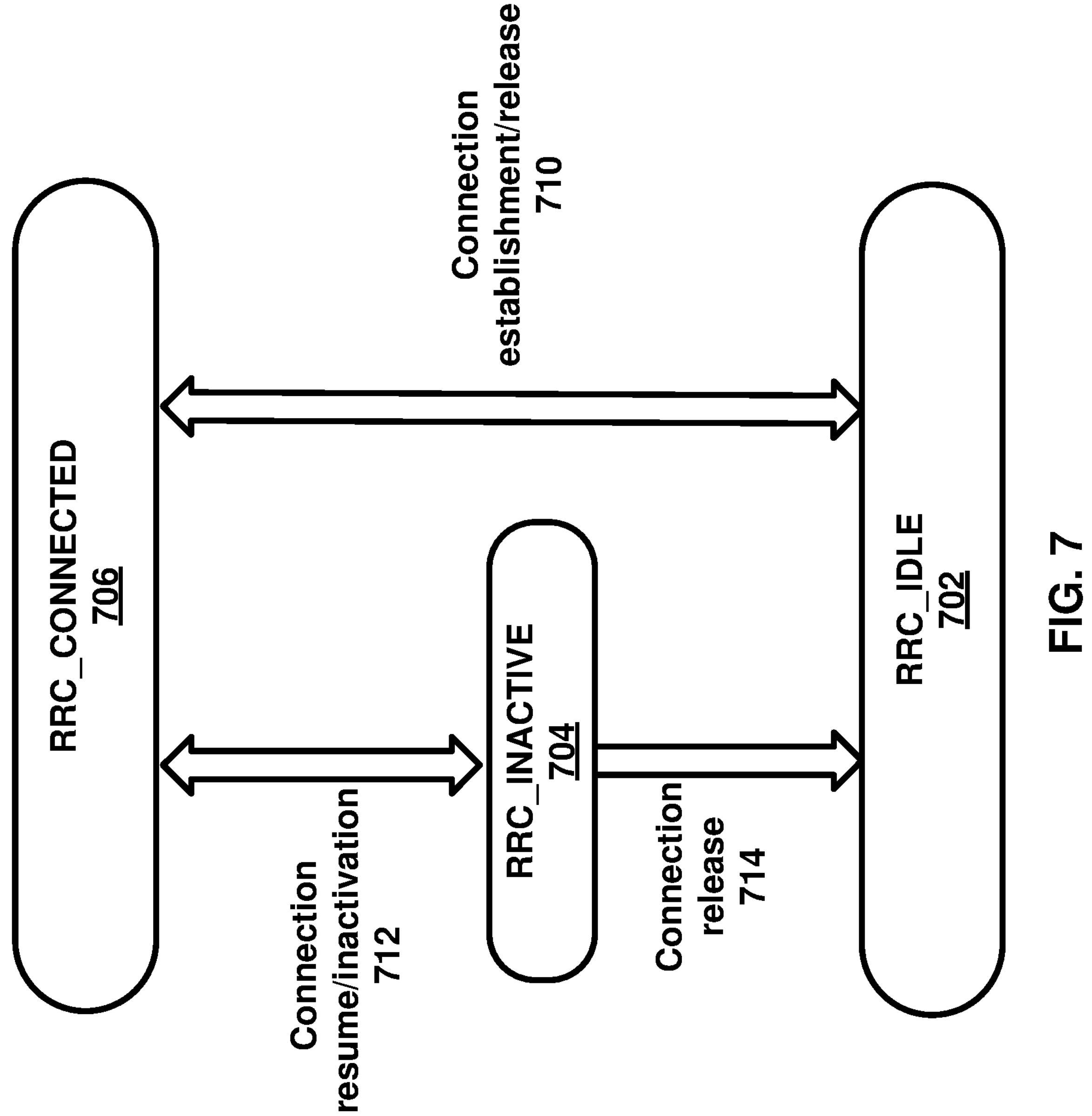
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16 QAM), 64 QAM and 256 QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f=2^{\mu}\cdot 15$ KHz (μ=0, 1, 2, . . . ). Example subcarrier spacings used in NR include 15 KHz (μ=0), 30 KHz (μ=1), 60 KHz (μ=2), 120 KHz (μ=3) and 240 KHz (μ=4). As discussed before, a duration of OFDM symbol is inversely proportional to the subcarrier spacing and therefor OFDM symbol duration may depend on the numerology (e.g., the μ value).

Figure 8:
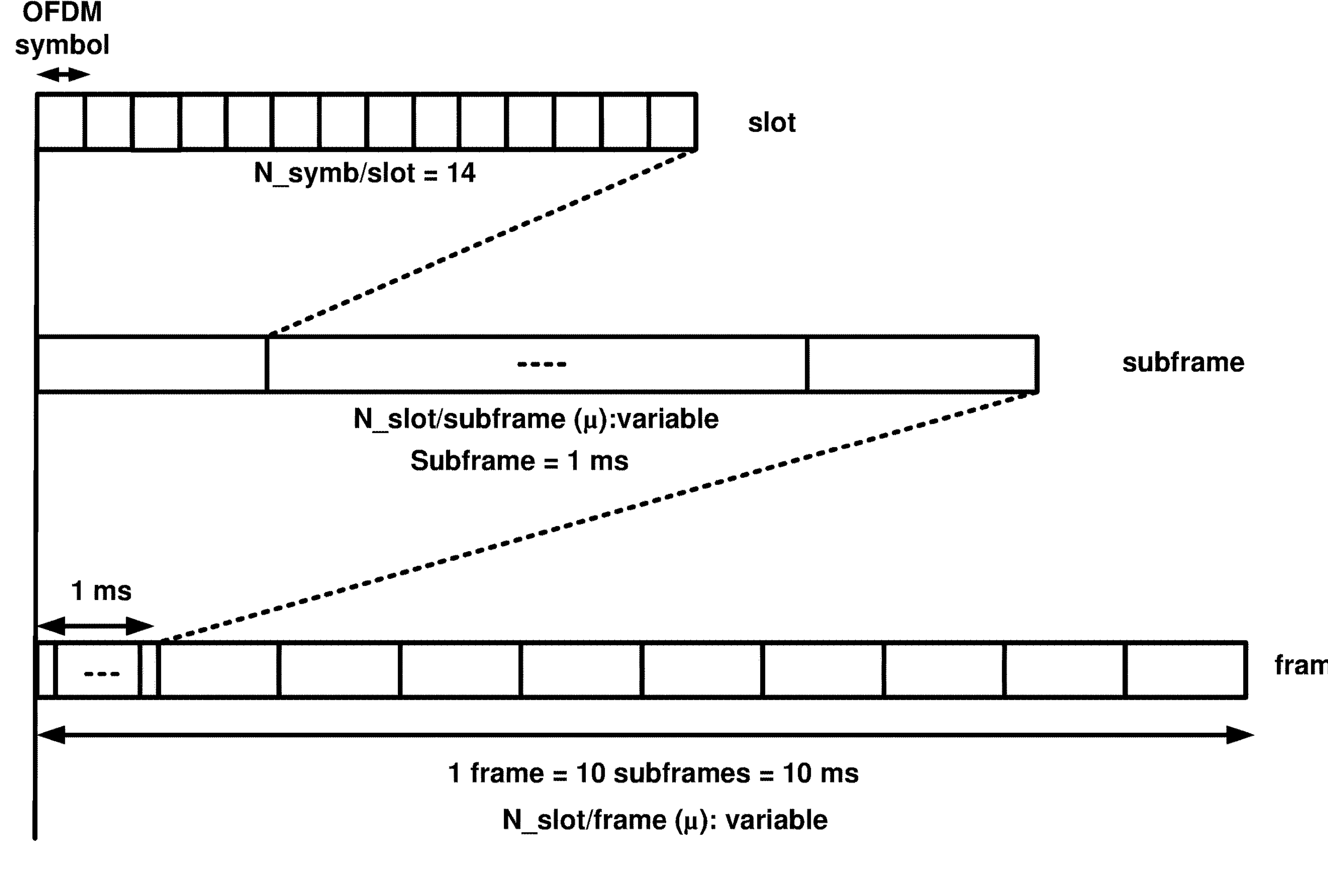
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $$N_{symb}^{slot}$$

OFDM symbols, wherein the $$N_{symb}^{slot}$$

may have a constant value (e.g., 14). Since different numerologies result in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $$N_{slot}^{subframe,\mu}$$

and the number of symbols per subframe may be expressed as $$N_{symb}^{subframe,\mu} = N_{symb}^{slot} N_{slot}^{subframe,\mu}.$$

A frame may have a duration of 10 ms and may consist of 10 subframes. The number of slots per frame may depend on the numerology and therefore may be variable. The number of slots per frame may generally be expressed as $$N_{slot}^{frame,\mu}.$$

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
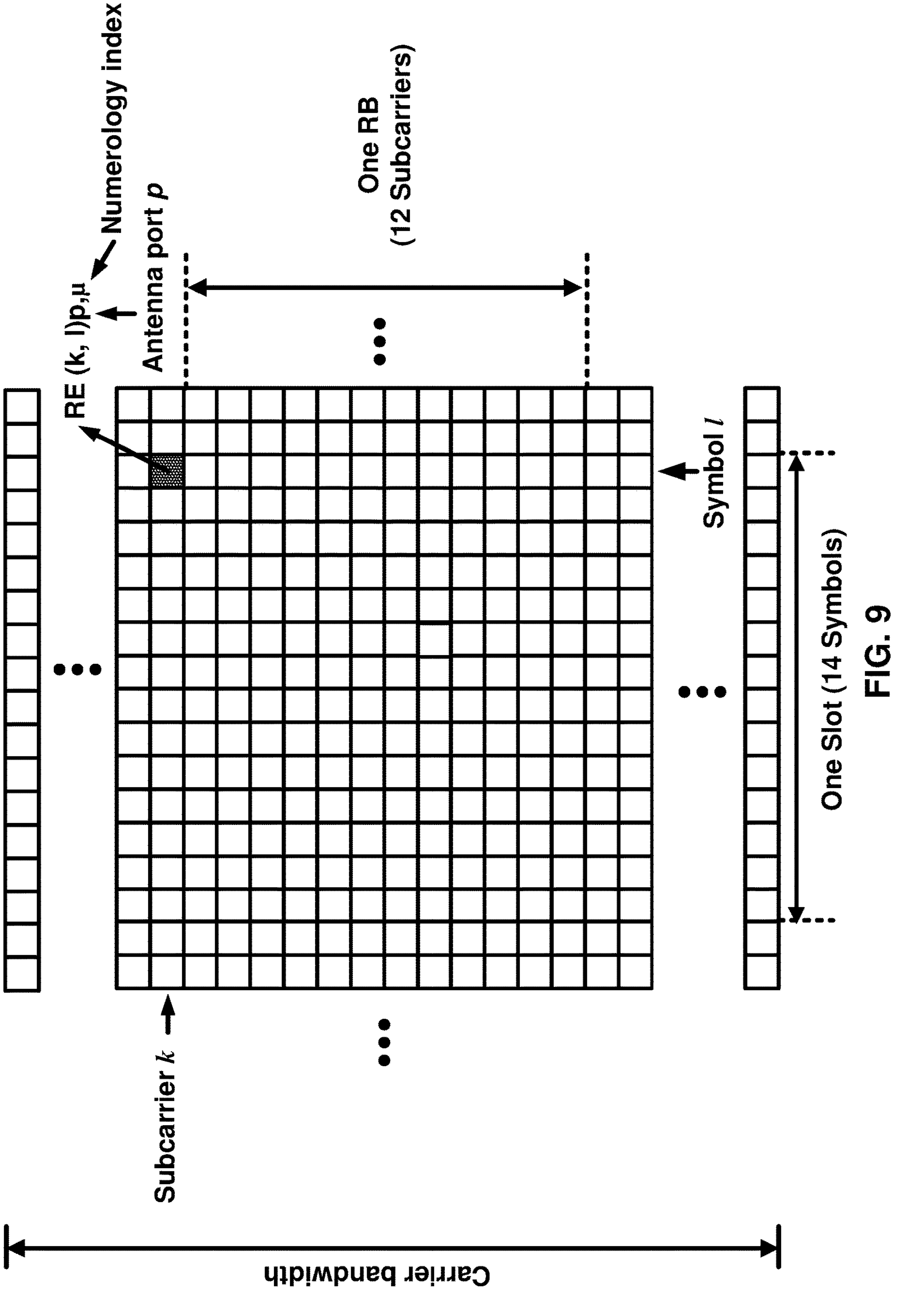
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k, l)_{p,\mu}$ where k is the index of a subcarrier in the frequency domain and l may refer to the symbol position in the time domain relative to some reference point. A resource block may be defined as $$N_{SC}^{RB} = 12$$

subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
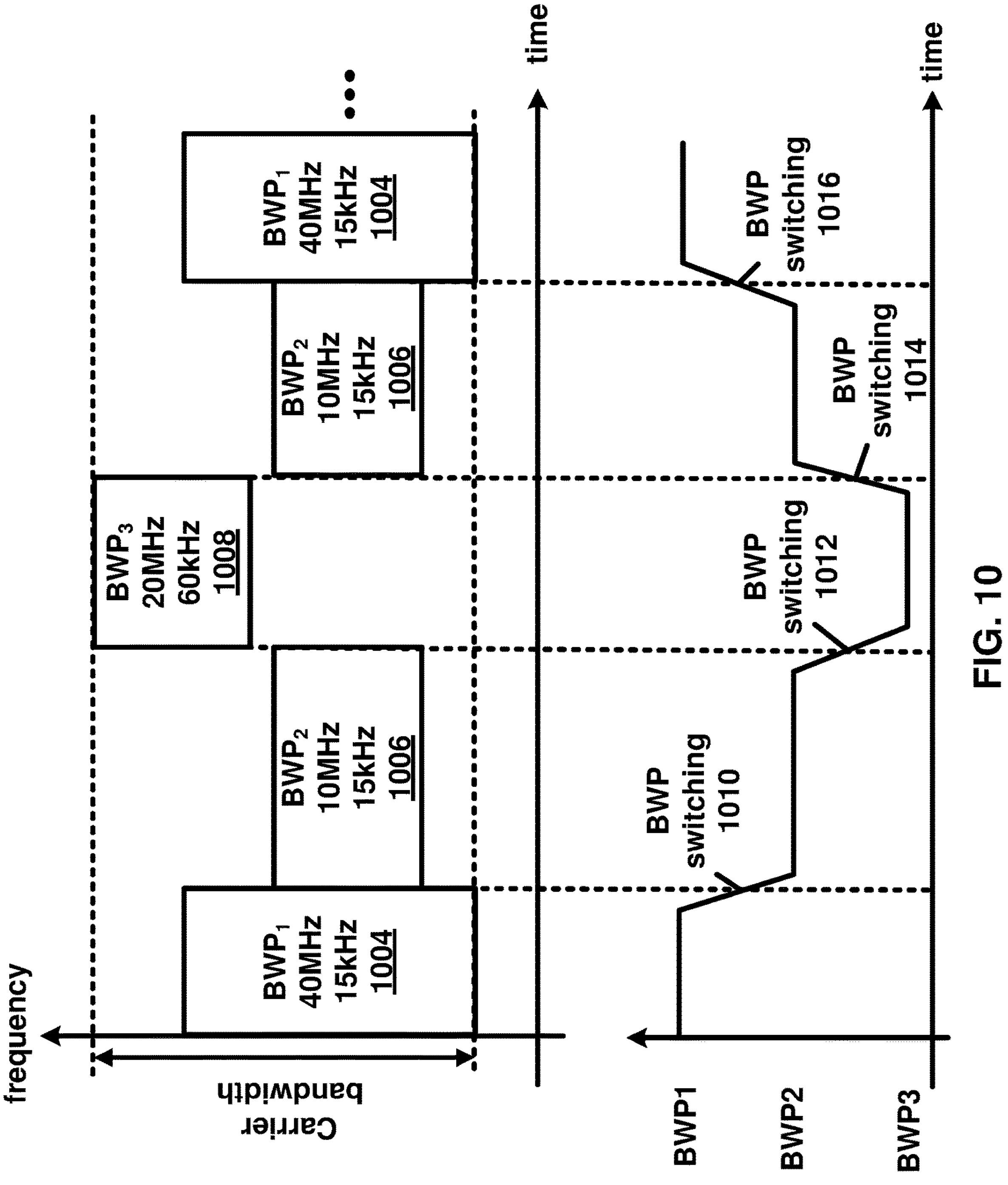
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figures 11A, 11B:
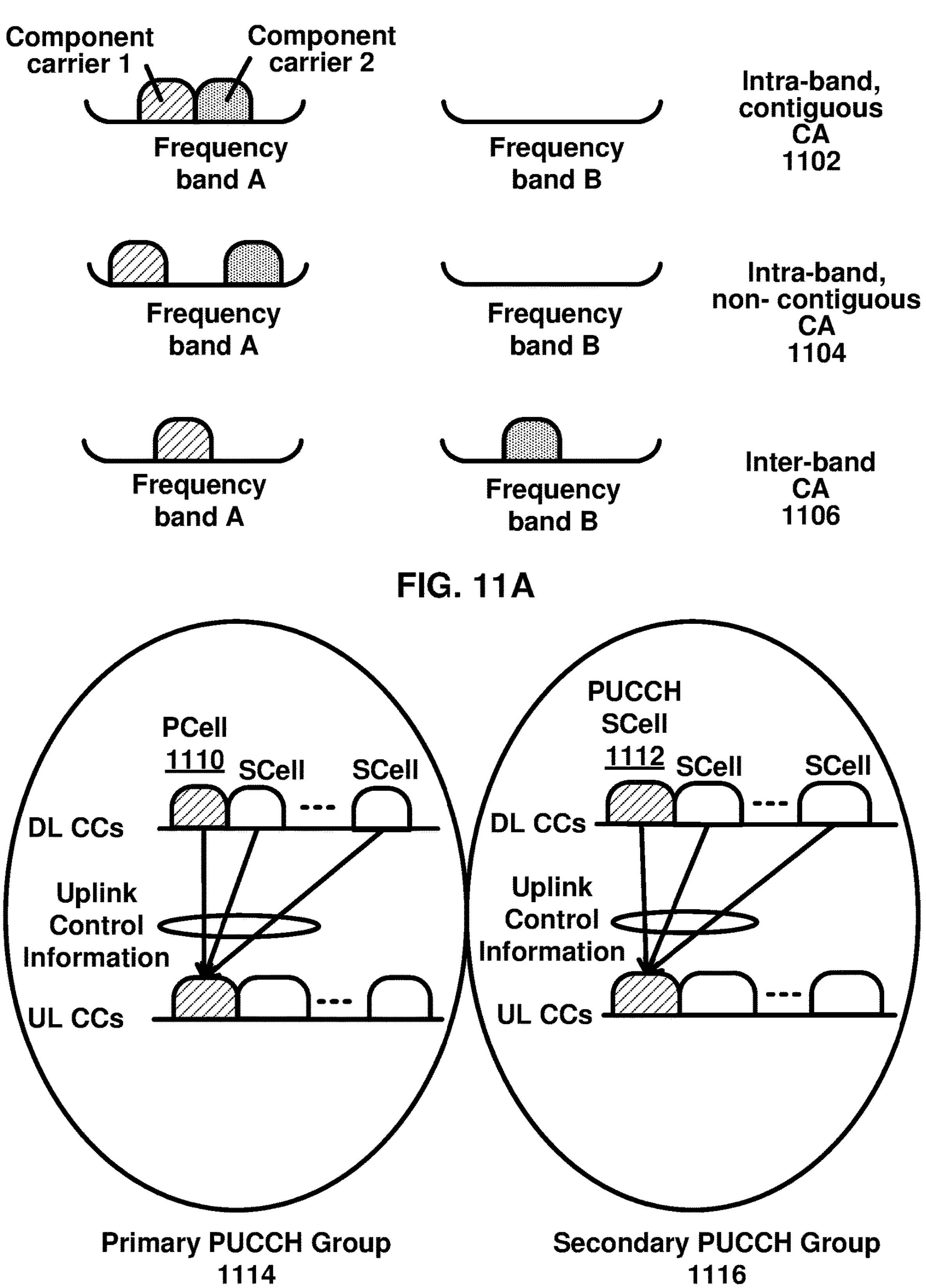
FIG. 11A shows example arrangements of carriers in carrier aggregation in accordance with several of various embodiments of the present disclosure.
FIG. 11B shows examples of uplink control channel groups in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
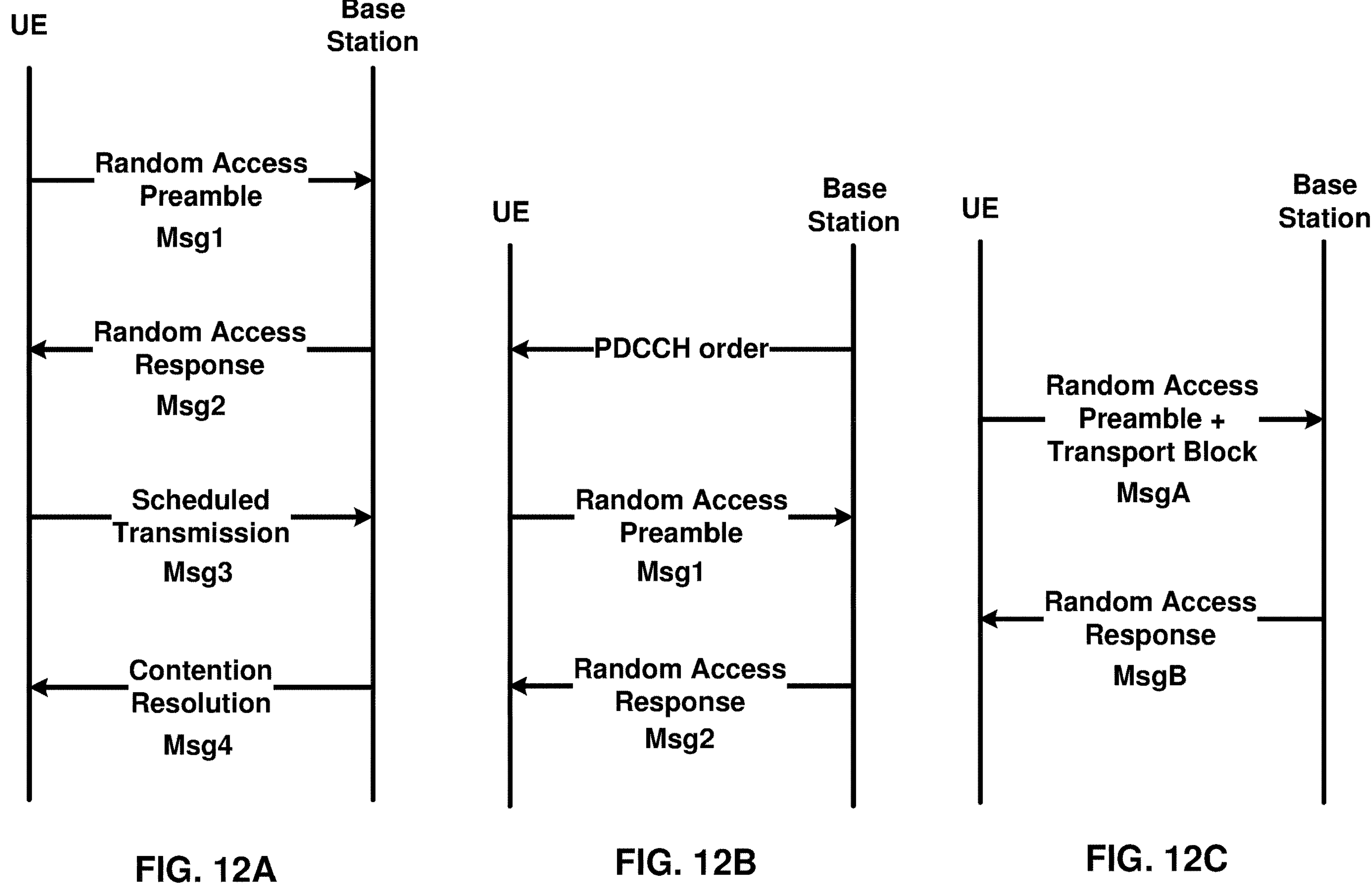
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
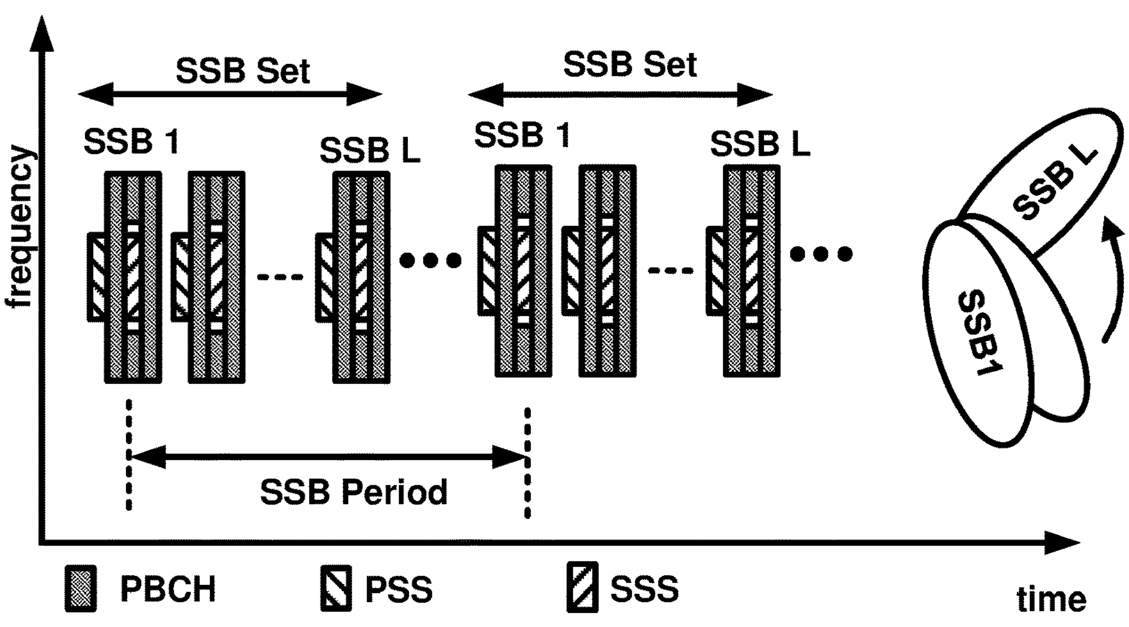
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB 1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some cases, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more severe in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
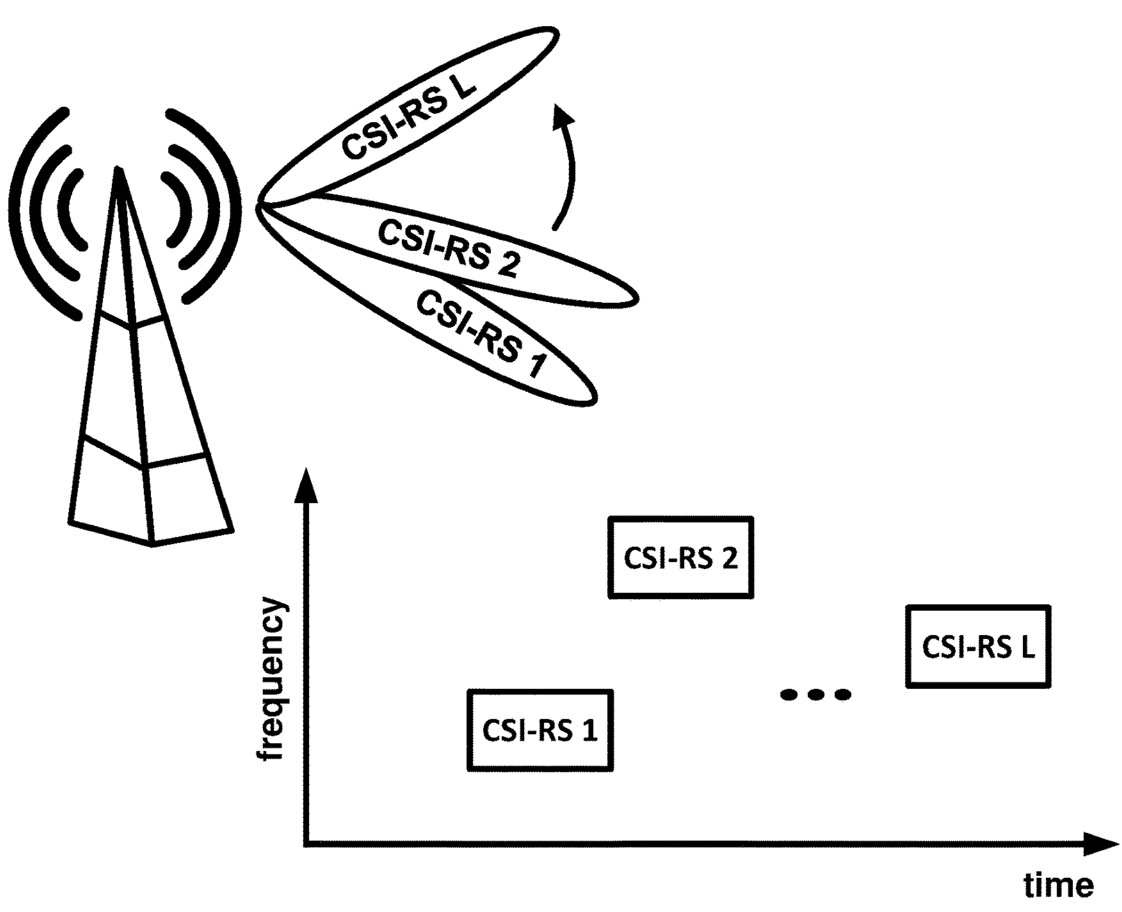
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figures 14A, 14B, 14C:
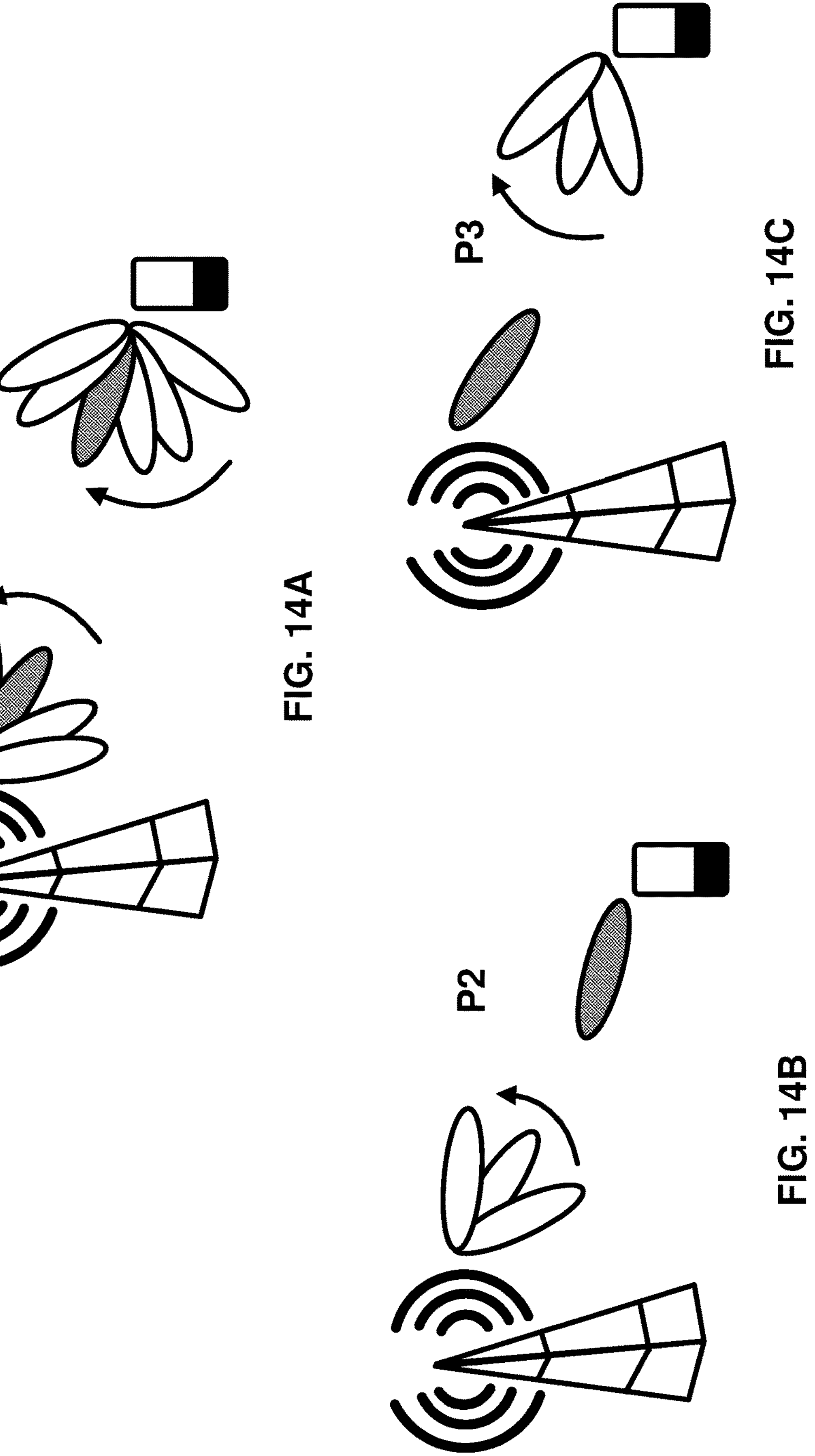
FIG. 14A, FIG. 14B and FIG. 14C show example beam management processes in accordance with several of various embodiments of the present disclosure.

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base stations (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
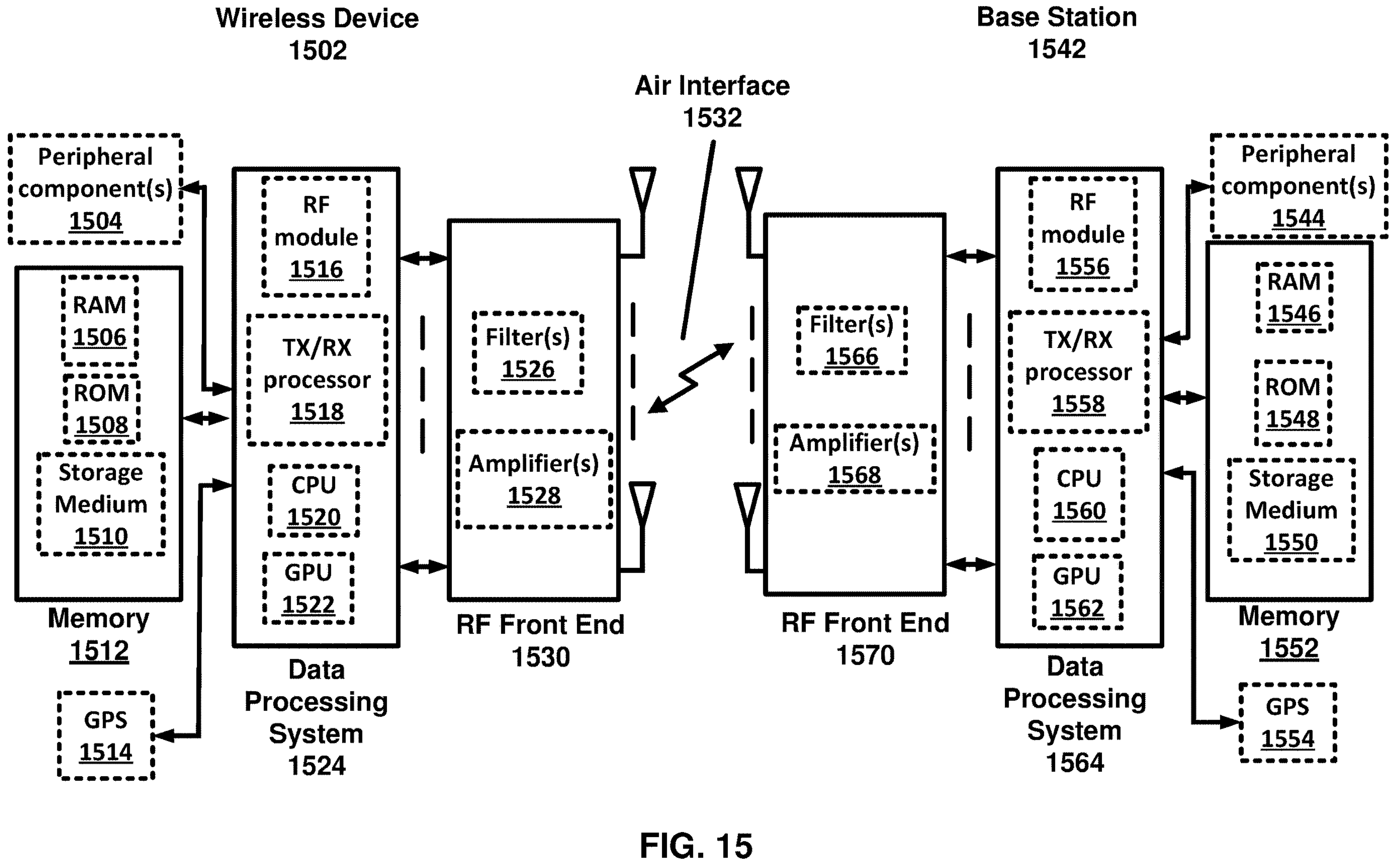
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more messages comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In example embodiments, a first radio access technology (RAT) (e.g., an LTE RAT) may coexist (e.g., share spectrum) with a second RAT (e.g., an NR RAT). In an example, the consistence/spectrum sharing between the first RAT and the second RAT may be a static coexistence/spectrum sharing or a dynamic coexistence/spectrum sharing.

In an example, with static coexistence/spectrum sharing, part of a band, allocated to the first RAT, may be allocated to the second RAT. With dynamic coexistence/spectrum sharing, the first and the second RAT may dynamically share the spectrum. With dynamic spectrum sharing (DSS), a tight coordination between the first and the second RAT may achieve reliable synchronization in time and frequency domains. A proper coordination between the first RAT and the second RAT schedulers may ensure that the same resource is not allocated to both systems at a given time.

In an example, a base station of the second RAT (e.g., gNB of NR) may provide the UE with the necessary Timing Advance Offset value using the field (e.g., based on n-TimingAdvanceOffset within RRCReconfiguration or SIB 1 message). The UE may add this offset to timing advance (TA) command provided by the base station and may adjust its uplink accordingly. In an example, the gNB may instruct a UE to apply a frequency shift using a configuration parameter (e.g., the field frequencyShift7p5khz within RRCReconfiguration or SIB 1 message). In an example, the network may configure the field frequencyShift7p5khz. With this frequency shift, the first RAT (e.g., LTE) and the second RAT (e.g., NR) may coexist within the same frequency/RB/RE grid.

In an example, the first RAT (e.g., LTE) and the second RAT (e.g., NR) time and frequency resources may be scheduled/shared in such a way that non-scheduled resources (e.g., resources used for PSS/SSS/PBCH and CRS) of the first RAT are not affected.

In an example, for DSS in the downlink, the first RAT (e.g., LTE) may transmit CRS in 4 or 6 non-contiguous OFDM symbols of each subframe (e.g., 4 OFDM symbols for CRS when using 1 or 2 antenna ports whereas 6 OFDM symbols when using 4 antenna ports). The second RAT (NR) time and frequency allocation in the downlink may be designed to not collide with CRS to avoid performance degradation to LTE users.

In an example, when the second RAT (e.g., NR) is using 30 kHz SCS, SSB may be multiplexed between two CRS symbols. With 30 kHz SCS, a resource element may occupy half the duration to that of the first RAT's (e.g., LTE's) 15 kHz SCS. Two (LTE) symbols may be enough for SSB transmission (4 NR OFDM symbols) and two consecutive symbols may be available between the two CRS occupied symbols irrespective of number of antenna ports.

In an example, in MBSFN subframes, the last 12 OFDM symbols may be reserved for eMBMS and these reserved symbols may be used for NR signals instead of eMBMS.

In an example, for second RAT (e.g., NR) PDSCH channel transmission, rate matching may be used to avoid the REs occupied by LTE CRS. In this case, the second RAT (e.g., NR) PDSCH may be spread around first RAT (e.g., LTE) CRS both in time and frequency domain by making use of PDSCH rate matching around REs occupied by the first RAT (e.g., LTE) CRS. In an example, the gNB may provide the UE with required configuration using an IE such as RateMatchPatternLTE-CRS. In an example, rate matching around the first RAT (e.g., LTE) CRS may be for a first subcarrier spacing (e.g., 15 kHz SCS). For a second SCS (e.g., for 30 kHz SCS), multiplexing of LTE CRS and NR PDSCH in frequency domain may not be possible due to mismatch in bandwidth of subcarriers. In an example, rate matching around the first RAT (e.g., LTE) PSS/SSS and PBCH may be done by defining reserved resources according to bitmaps which may be configured by the network. This rate matching pattern may be configured using an RRC IE such as rateMatchPatternToAddModList.

In an example, the first RAT (LTE) CRS rate matching may be used for DSS. The UE may know the first RAT (LTE) CRS pattern that it may rate match around when receiving DL transmissions on a cell sharing LTE and NR.

In an example, the second RAT (e.g., NR) PDCCH may not be transmitted on those symbols where the first RAT (e.g., LTE) CRS is being transmitted. The first RAT (e.g., LTE) CRS may be present in first OFDM symbol in case of 2 antenna ports and first and second OFDM symbols in case of 4 antenna ports. The second RAT (e.g., NR) may allow PDCCH transmission on any symbol. In an example, PDCCH may be transmitted on a symbol that doesn't contain the first RAT (e.g., LTE) CRS. The network may inform the UE about the starting OFDM symbol(s) in which PDCCH is transmitted by making use of the field monitoringSymbolsWithinSlot.

In an example, rate matching around the first RAT (e.g., LTE) PSS/SSS and PBCH may be done by defining reserved resources according to bitmaps which may configured by the network. This rate matching pattern may be configured using RRC IE rateMatchPatternToAddModList.

In an example, a frequency difference between the second RAT (e.g., NR) and the first RAT (e.g., LTE) uplink subcarrier mapping of 7.5 kHz may cause inter-carrier interference. To mitigate for the ICI caused by this frequency shift, the gNB may instruct/indicate to a UE to apply 7.5 kHz frequency shift using a configuration parameter (e.g., the field frequencyShift7p5khz within RRCReconfiguration or SIB1 message).

In an example, when PDSCH time-domain duration is 13 or 14 OFDM symbols and if one additional DMRS is configured, the DMRS may be located at the 11th OFDM symbol. In the case of DSS, this DMRS symbol may coincide/overlap with the first RAT (LTE) CRS symbol. Hence, for additional DMRS symbol, OFDM symbol 12 may be used instead of OFDM symbol 11. By including the field additionalDMRS-DL-Alt, the UE may indicate its support for using OFDM symbol 12 for additional DMRS.

In an example, a rateMatchingLTE-CRS capability IE may be used. For the second RAT (e.g., NR) PDSCH transmission, rate matching may be used to avoid the REs occupied by the first RAT (LTE) CRS. In this case, the second RAT (e.g., NR) PDSCH may be spread around the first RAT (e.g., LTE) CRS both in time and frequency domain by making use of PDSCH rate matching around REs occupied by the first RAT (LTE) CRS. The field rateMatchingLTE-CRS may indicate whether the UE supports receiving PDSCH with resource mapping that excludes the REs configured by the first RAT (LTE) CRS. In an example, the UE may indicate the support individually for each band.

In an example, an additionalDMRS-DL-Alt IE may be used. This field may indicate whether the UE supports the alternative additional DMRS position for coexistence with the first RAT (e.g., LTE) CRS. It may be applied to 15 kHz SCS and one additional DMRS case. When PDSCH time-domain duration is 13 or 14 OFDM symbols and if one additional DMRS is configured, the DMRS may be located at the 11th OFDM symbol. In the case of DSS, this DMRS symbol may coincide/overlap with the first RAT (e.g., LTE) CRS symbol. For additional DMRS symbol, OFDM symbol 12 may be used instead of OFDM symbol 11.

In an example, an lte-CRS-ToMatchAround IE may be used. This IE may be used to configure the UE with a pattern to rate match around the first RAT (e.g., LTE) CRS and may be configured as part of RRCReconfiguration or SIB 1.

In an example, a frequencyShift7p5khz IE may be used. To mitigate for the ICI caused by the underlying first RAT (e.g., LTE) and second RAT (e.g., NR) waveform frequency shift, the gNB may instruct/indicate to a UE to apply 7.5 kHz frequency shift using the field frequencyShift7p5khz within RRCReconfiguration or SIB1 message.

In an example, a n-TimingAdvanceOffset IE may be used. The gNB may provide the UE with the necessary Timing Advance Offset value using the field n-TimingAdvanceOffset within RRCReconfiguration or SIB1 message. The UE may add this offset to TA command provided by the base station and may adjust its uplink transmission timing accordingly.

In an example, an IE monitoringSymbolsWithinSlot may be used. In an example, the second RAT (e.g., NR) PDCCH may not be transmitted on those symbols where the first RAT (LTE) CRS is being transmitted. The first RAT (e.g., LTE CRS) may be present in the first OFDM symbol in case of two antenna ports and first and second OFDM symbols in case of four antenna ports. The network may inform the UE about the starting OFDM symbol(s) in which PDCCH is transmitted by making use of the field monitoringSymbolsWithinSlot. This field may be configured as part of PDCCH-Config.

In an example, an IE rateMatchPatternToAddModList may be used. In an example, Rate matching around the first RAT (e.g., LTE) PSS/SSS and PBCH may be done by defining reserved resources according to bitmaps which may be configured by the network. This rate matching pattern may be configured using RRC IE rateMatchPatternToAddModList within PDSCH-Config.

In an example, the downlink cell specific reference signal in a first RAT (e.g., LTE) may be used for the following purposes: cell search and initial acquisition, downlink channel quality measurements, downlink channel estimation for coherent demodulation/detection at the UE.

In an example, demodulation reference signal (DMRS) may be used to estimate the radio channel for demodulation. In an example, the DMRS may be UE-specific. In an example, the DMRS may be beamformed. In an example, the DMRS may be confined in a scheduled resource. In an example, the DMRS may be transmitted when necessary, both in DL and UL. In an example, to support multiple-layer MIMO transmission, multiple orthogonal DMRS ports may be scheduled, one for each layer.

In an example, an IE ControlResourceSet may be used to configure a time/frequency control resource set (CORESET) in which to search for downlink control information. A field/parameter cce-REG-MappingType may indicate mapping of Control Channel Elements (CCE) to Resource Element Groups (REG). A field/parameter controlResourceSetId may identify the instance of the ControlResourceSet IE. Value 0 may identify the common CORESET configured in MIB and in ServingCellConfigCommon (controlResourceSetZero) and may not be used in the ControlResourceSet IE. Other values may identify CORESETs configured by dedicated signalling or in SIB 1. The controlResourceSetId may be unique among the BWPs of a serving cell. A field/parameter coresetPoolIndex may indicate the index of the CORESET pool for this CORESET. If the field is absent, the UE may apply the value 0. A field/parameter duration may indicate contiguous time duration of the CORESET in number of symbols. A field/parameter frequencyDomainResources may indicate frequency domain resources for the CORESET. A bit may correspond to a group of 6 RBs, with grouping starting from the first RB group in the BWP. A field/parameter interleaverSize may indicate Interleaver size. A field/parameter pdcch-DMRS-ScramblingID may indicate PDCCH DMRS scrambling initialization. When the field is absent, the UE may apply the value of the physCellId configured for this serving cell. A field/parameter precoderGranularity may indicate Precoder granularity in frequency domain. A field/parameter rb-Offset may indicate the RB level offset in units of RB from the first RB of the first 6 RB group to the first RB of BWP. Regarding the field/parameter reg-BundleSize, Resource Element Groups (REGs) can be bundled to create REG bundles. This parameter may define the size of such bundles. Regarding the field/parameter shiftIndex, when the field is absent, the UE may apply the value of the physCellIdconfigured for this serving cell. The field/ parameter tci-PresentInDCI may indicate if TCI field is present or absent in DCI format 1_1. When the field is absent the UE may consider the TCI to be absent/disabled. In case of cross carrier scheduling, the network may set this field to enabled for the ControlResourceSet used for cross carrier scheduling in the scheduling cell if enableDefaultBeamForCCS is not configured. A field/parameter tci-PresentDCI-1-2 may configure the number of bits for "Transmission configuration indicator" in DCI format 1-2. When the field is absent the UE may apply the value of 0 bit for the "Transmission configuration indicator" in DCI format 1_2. A field/parameter tci-StatesPDCCH-ToAddList may indicate a subset of the TCI states defined in pdsch-Config included in the BWP-DownlinkDedicated corresponding to the serving cell and to the DL BWP to which the ControlResourceSet belong to. They may be used for providing QCL relationships between the DL RS(s) in one RS Set (TCI-State) and the PDCCH DMRS ports.

In an example, the ControlResourceSetId IE may concern a short identity, used to identify a control resource set within a serving cell. The ControlResourceSetId=0 may identify the ControlResourceSet #0 configured via PBCH (MIB) and in controlResourceSetZero (ServingCellConfigCommon). The ID space may be used across the BWPs of a Serving Cell.

In an example, an IE SearchSpace may define how/where to search for PDCCH candidates. A search space may be associated with one ControlResourceSet.

In an example, the IE SearchSpaceId may be used to identify Search Spaces. The ID space may be used across the BWPs of a Serving Cell. The search space with the SearchSpaceId=0 may identify the search space configured via PBCH (MIB) and in ServingCellConfigCommon (searchSpaceZero).

In example embodiments, rate matching may be used to match the number of coded bits to resources available for PDCCH transmission. For example, a wireless device may determine that certain resources are not available for PDCCH transmission (e.g., due to being used for transmission of non-scheduled signals, e.g., reference signals associated with a different RAT such as LTE) and may rate match around those non-available resources. In example embodiments, non-scheduled signals (e.g., reference signals, e.g., CRS) of a first RAT (e.g., an LTE RAT) may puncture resource used in transmission of a downlink control channel (e.g., PDCCH) via a second RAT (e.g., an NR RAT).

Example embodiments may enable a second RAT (e.g., NR) PDCCH reception in symbols with a first RAT (e.g., LTE) CRS REs.

Example embodiments may enable a first RAT (e.g., LTE) CRS to puncture a second RAT (e.g., NR PDCCH). Example embodiments may enhance one or more reference signals (e.g., DMRS) associated with PDCCH of a second RAT (e.g., NR).

Example embodiments may enable a UE to be configured with two overlapping CRS rate matching patterns.

With dynamic spectrum sharing (DSS) between radio access technologies (e.g., between an NR RAT and an LTE RAT), downlink control channel transmission associated with a first radio access technology (RAT) may be impacted by the non-scheduled transmissions (e.g., reference signal transmissions) of a second RAT. There is a need to enhance control channel transmission processes in a DSS scenario. Example embodiments enhance the control channel transmission processes in a DSS scenario.

In an example embodiment as shown in FIG. 16, a wireless device may determine whether a reference signal (e.g., CRS) of a first radio access technology (e.g., an LTE RAT) punctures resources (e.g., one or more resource elements (REs)/one or more resource blocks (RBs)) of a downlink control channel (e.g., PDCCH) of a second RAT (e.g., a NR RAT) or whether a rate matching is used (e.g., used by a base station) to rate match around the reference signal of the first RAT for transmission of the downlink control channel of the second RAT. The wireless device may determine whether resources (e.g., one or more REs) associated with (e.g., used for transmission of) the reference signal of the first RAT are used in transmission of and/or overlap with resources used in transmission of the downlink control channel of the second RAT or whether a rate matching is used (e.g., used by a base station) to rate match around the reference signal of the first RAT for transmission of the downlink control channel of the second RAT.

In an example, the wireless device may receive one or more configuration parameters and may make the determination based on the one or more configuration parameters, for example, one or more configurations that are associated with the second RAT (e.g., the NR RAT).

In an example, the one or more configuration parameters may comprise wireless device specific configuration parameters. In an example, the one or more configuration parameters may be RRC parameters, e.g., received via one or more RRC messages. In an example, the one or more configuration parameters may be associated with a first CORESET and/or a first search space, e.g., may belong to the first CORESET configuration and/or to the first search space configuration. In an example, the one or more configuration parameters may comprise a first parameter indicating a first identifier of the first CORESET or a first identifier of the first search space. The wireless device may make the determination based on the downlink control channel being received based on the first CORESET and/or based on the first search space. In an example, the determination by the wireless device may apply to the first CORESET/first search space based on the one or more configuration parameters being configured for/associated with the first COREST/first search space.

In an example, the one or more configuration parameters may be broadcast parameter, e.g., received via a broadcast message such as a SIB or a MIB.

In an example, the wireless device may receive a MAC CE and may make the determination based on the MAC CE, e.g., based on value(s) of field(s) of the MAC CE. The MAC CE may indicate (e.g., a value of a field of the MAC CE) an identifier of a first CORESET/first search space indicating which CORESET/search space the MAC CE applies to. The wireless device may receive the downlink control channel based on the first CORESET/ first search space.

The wireless device may receive a downlink control information via the downlink control channel. The wireless device may receive the downlink control information via the downlink control channel based on the determination. The wireless device may receive the downlink control channel (e.g., PDCCH) based on the second RAT (e.g., using the physical layer of the second RAT, e.g., the NR RAT). The downlink control information may be a scheduling DCI and may comprise scheduling information for a downlink or an uplink transmission.

Figure 17:
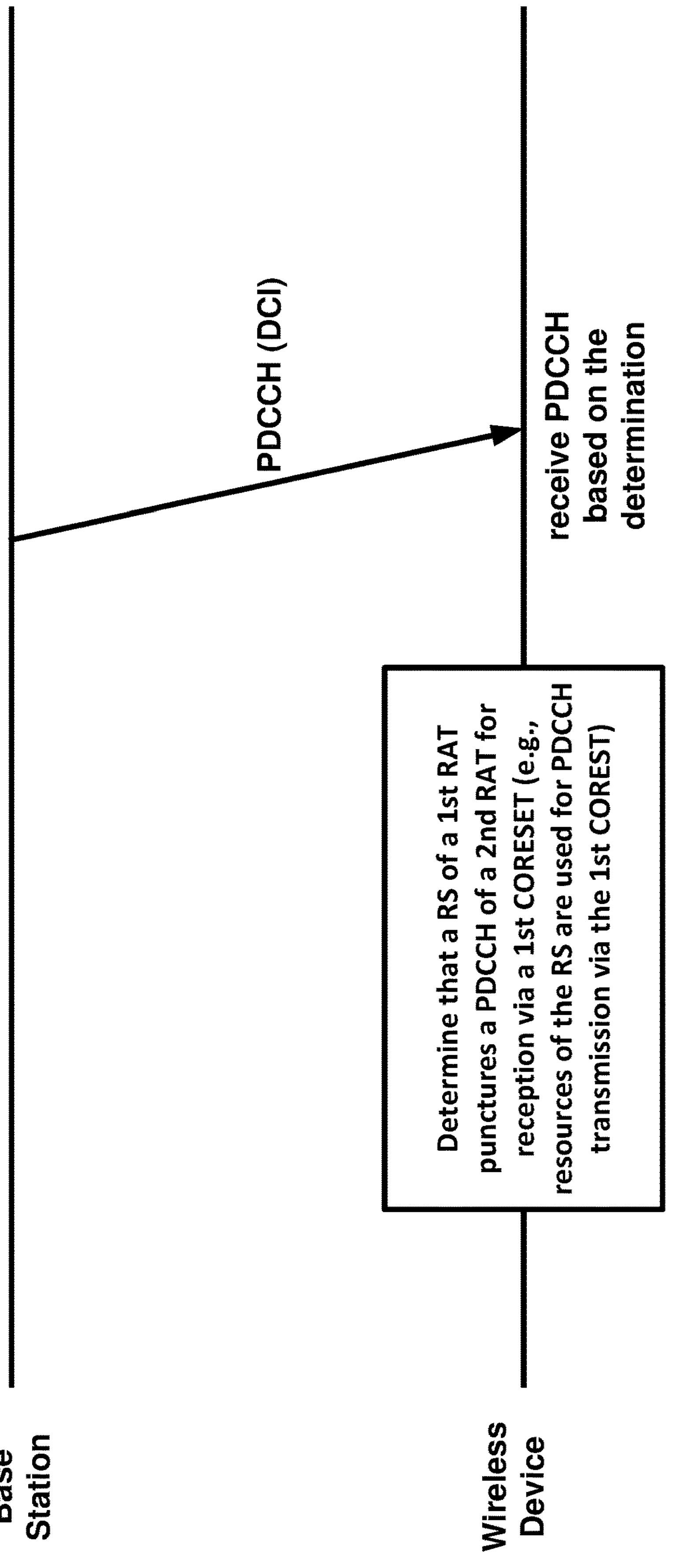
FIG. 17 shows an example process in accordance with several of various embodiments of the present disclosure.

In an example embodiment as shown in FIG. 17, a wireless device may determine that a reference signal (e.g., CRS) of a first radio access technology (e.g., an LTE RAT) punctures resources (e.g., one or more resource elements (REs)/one or more resource blocks (RBs)) of a downlink control channel (e.g., PDCCH) received via a first CORESET. The wireless device may determine that resources (e.g., one or more REs) associated with (e.g., used for transmission of) the reference signal of the first RAT are used in transmission of and/or overlap with resources used in transmission of the downlink control channel (e.g., PDCCH) via the first CORESET.

In an example, the wireless device may receive one or more first configuration parameters and may make the determination based on the one or more first configuration parameters.

In an example, the one or more first configuration parameters may comprise wireless device specific configuration parameters. In an example, the one or more first configuration parameters may be RRC parameters, e.g., received via one or more RRC messages. In an example, the one or more first configuration parameters may be associated with a first CORESET and/or a first search space, e.g., may belong to the first CORESET configuration and/or to the first search space configuration. In an example, the one or more first configuration parameters may comprise a first parameter indicating a first identifier of the first CORESET or a first identifier of the first search space. The wireless device may make the determination based on the downlink control channel being received based on the first CORESET and/or based on the first search space. In an example, the determination by the wireless device may apply to the first CORESET/first search space based on the one or more first configuration parameters being configured for/associated with the first COREST/first search space.

In an example, the one or more first configuration parameters may be broadcast parameter, e.g., received via a broadcast message such as a SIB or a MIB.

In an example, the wireless device may receive a MAC CE and may make the determination based on the MAC CE, e.g., based on value(s) of field(s) of the MAC CE. The MAC CE may indicate (e.g., a value of a field of the MAC CE) an identifier of a first CORESET/first search space indicating which CORESET/search space the MAC CE applies to. The wireless device may receive the downlink control channel based on the first CORESET/first search space.

The wireless device may receive a downlink control information via the downlink control channel. The wireless device may receive the downlink control information via the downlink control channel based on the determination. The wireless device may receive the downlink control channel (e.g., PDCCH) based on a second RAT (e.g., using the physical layer of the second RAT, e.g., a NR RAT). The downlink control information may be a scheduling DCI and may comprise scheduling information for a downlink or an uplink transmission.

In an example, the wireless device may second determine that the reference signal (e.g., CRS) of the first radio access technology (e.g., the LTE RAT) does not puncture resources (e.g., one or more resource elements (REs)/one or more resource blocks (RBs)) of the downlink control channel (e.g., PDCCH) received via a second CORESET. The wireless device may determine that resources (e.g., one or more REs) associated with (e.g., used for transmission of) the reference signal of the first RAT are not used in transmission of and/or overlap with resources used in transmission of the downlink control channel (e.g., PDCCH) via the second CORESET. For example, the wireless device may determine that a rate matching is used (e.g., used by a base station) to rate match around the reference signal of the first RAT for transmission of the downlink control channel.

In an example, the wireless device may receive one or more second configuration parameters and the second determination may be based on the one or more second configuration parameters.

In an example, the one or more second configuration parameters may comprise wireless device specific configuration parameters. In an example, the one or more second configuration parameters may be RRC parameters, e.g., received via one or more RRC messages. In an example, the one or more second configuration parameters may be associated with the second CORESET and/or the second search space, e.g., may belong to the first CORESET configuration and/or to the first search space configuration. In an example, the one or more second configuration parameters may comprise a second parameter indicating a second identifier of the second CORESET or a second identifier of the second search space. The wireless device may make the second determination based on the downlink control channel being received based on the second CORESET and/or based on the second search space. In an example, the second determination by the wireless device may apply to the second CORESET/second search space based on the one or more second configuration parameters being configured for/associated with the second COREST/second search space.

In an example, the one or more second configuration parameters may be broadcast parameter, e.g., received via a broadcast message such as a SIB or a MIB.

In an example, the wireless device may receive a MAC CE and may make the second determination based on the MAC CE, e.g., based on value(s) of field(s) of the MAC CE. The MAC CE may indicate (e.g., a value of a field of the MAC CE) an identifier of a second CORESET/second search space indicating which CORESET/search space the MAC CE applies to. The wireless device may receive the downlink control channel based on the second CORESET/second search space.

Figure 18:
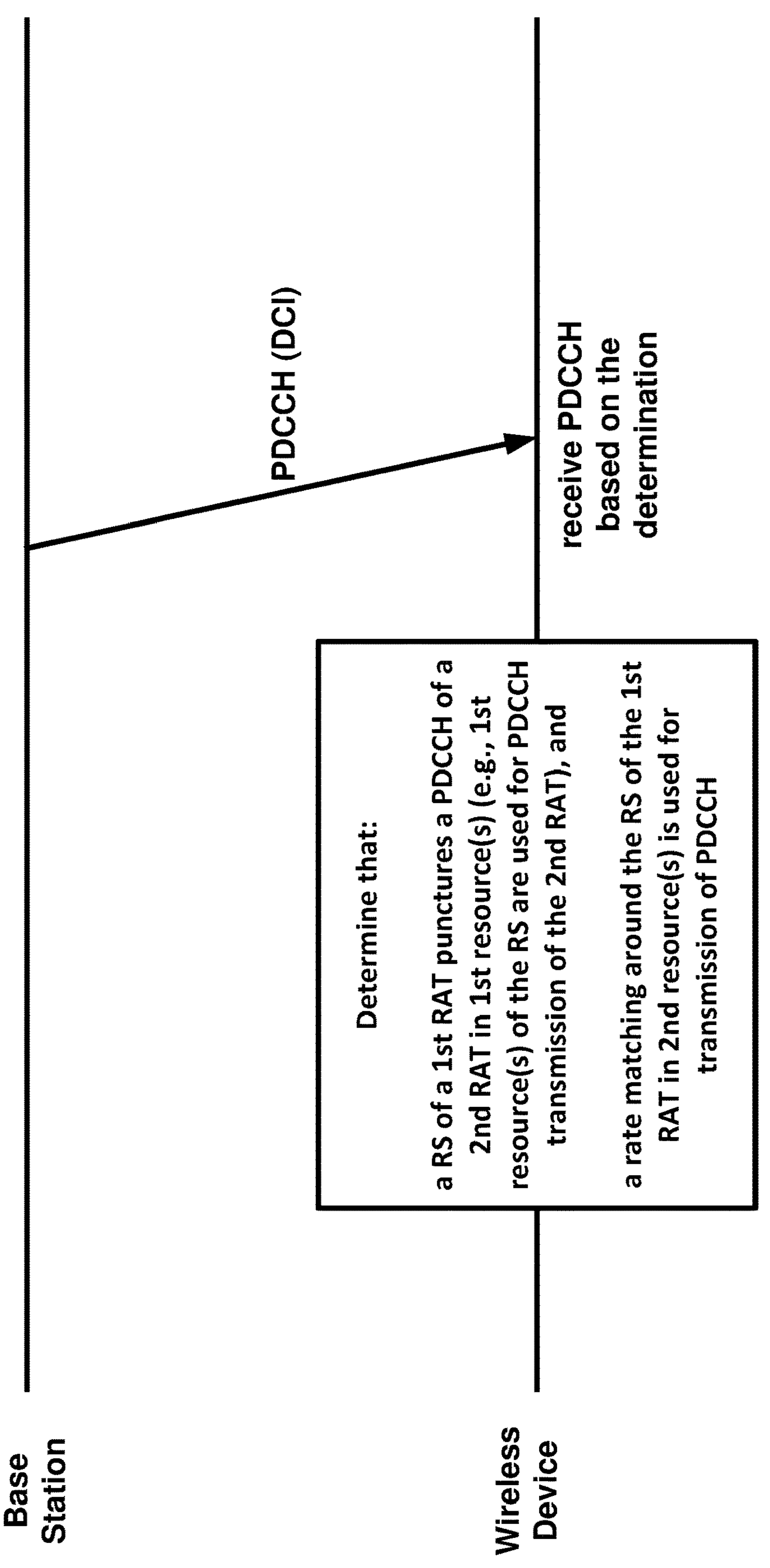
FIG. 18 shows an example process in accordance with several of various embodiments of the present disclosure.

In an example embodiment as shown in FIG. 18, a wireless device may determine that a reference signal (e.g., CRS) of a first radio access technology (e.g., an LTE RAT) punctures one or more first resources (e.g., one or more first resource elements (REs)/one or more first resource blocks (RBs)) of a downlink control channel (e.g., PDCCH). The wireless device may determine that the one or more first resources (e.g., the one or more first REs) associated with (e.g., used for transmission of) the reference signal of the first RAT are used in transmission of and/or overlap with resources used in transmission of the downlink control channel (e.g., PDCCH). The wireless device may further determine that a rate matching is used (e.g., used by a base station) to rate match around the reference signal of the first RAT in one or more second resources (e.g., one or more second resource elements (REs)/one or more second resource blocks (RBs)) for transmission of the downlink control channel.

In an example, the wireless device may receive one or more configuration parameters and may make the determination based on the one or more configuration parameters.

In an example, the one or more configuration parameters may comprise wireless device specific configuration parameters. In an example, the one or more configuration parameters may be RRC parameters, e.g., received via one or more RRC messages. In an example, the one or more configuration parameters may be associated with a first CORESET and/or a first search space, e.g., may belong to the first CORESET configuration and/or to the first search space configuration. In an example, the one or more configuration parameters may comprise a first parameter indicating a first identifier of the first CORESET or a first identifier of the first search space. The wireless device may make the determination based on the downlink control channel being received based on the first CORESET and/or based on the first search space. In an example, the determination by the wireless device may apply to the first CORESET/first search space based on the one or more configuration parameters being configured for/associated with the first COREST/first search space.

In an example, the one or more configuration parameters may be broadcast parameter, e.g., received via a broadcast message such as a SIB or a MIB.

In an example, the wireless device may receive a MAC CE and may make the determination based on the MAC CE, e.g., based on value(s) of field(s) of the MAC CE. The MAC CE may indicate (e.g., a value of a field of the MAC CE) an identifier of a first CORESET/first search space indicating which CORESET/search space the MAC CE applies to. The wireless device may receive the downlink control channel based on the first CORESET/first search space.

The wireless device may receive a downlink control information via the downlink control channel. The wireless device may receive the downlink control information via the downlink control channel based on the determination. The wireless device may receive the downlink control channel (e.g., PDCCH) based on a second RAT (e.g., using the physical layer of the second RAT, e.g., a NR RAT). The downlink control information may be a scheduling DCI and may comprise scheduling information for a downlink or an uplink transmission.

Figure 19:
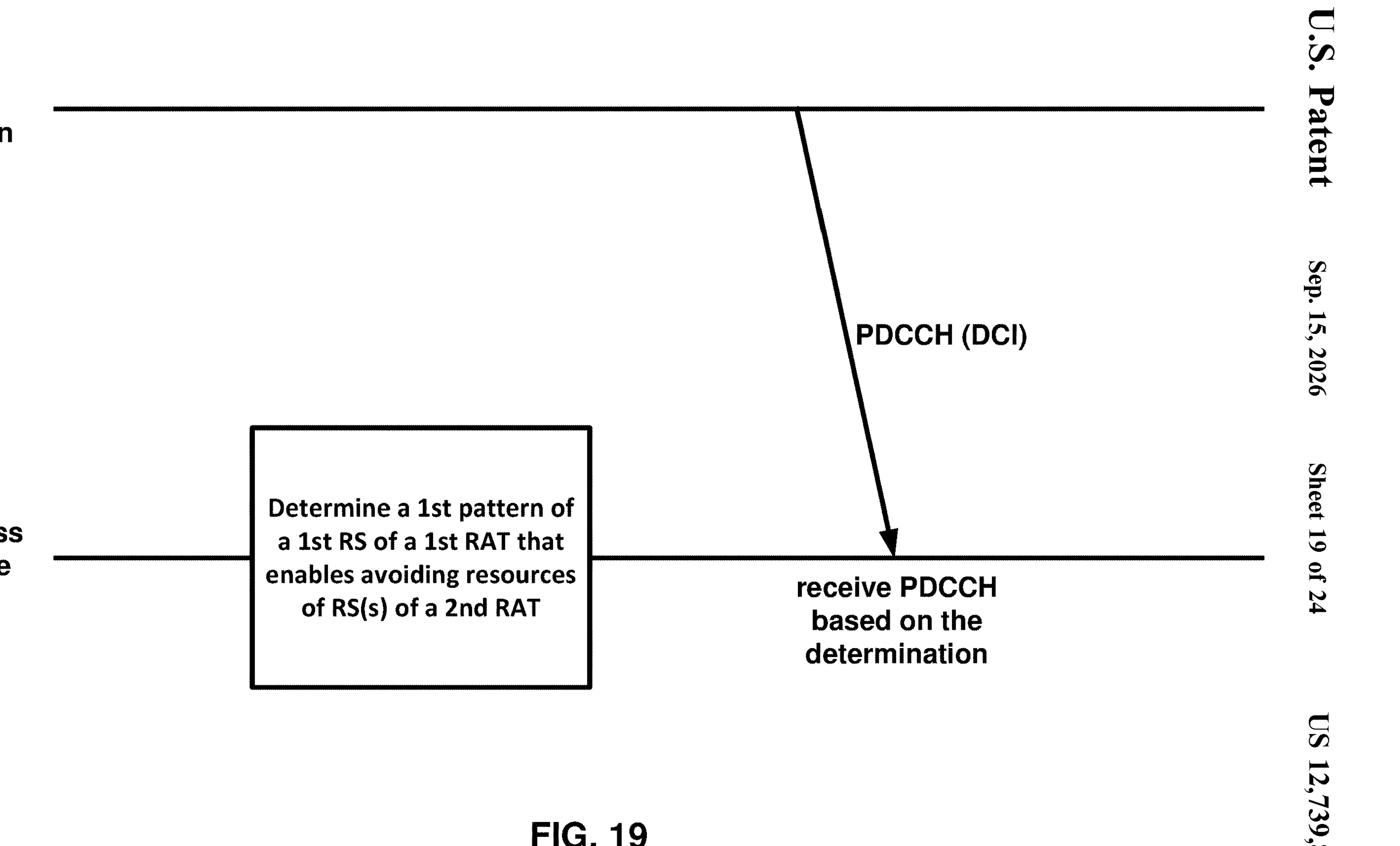
FIG. 19 shows an example process in accordance with several of various embodiments of the present disclosure.

In an example embodiment as shown in FIG. 19, a wireless device may determine a first pattern of a first reference signal (e.g., demodulation reference signal (DMRS)) associated with a first RAT (e.g., an NR RAT) and a downlink control channel (e.g., PDCCH) of the first RAT. The first pattern may define/indicate resources (e.g., resource elements (REs)) used for transmission of the first reference signal. The first pattern may avoid resources (e.g., REs) associated with one or more reference signals of a second RAT (e.g., an LTE RAT). In an example, the one or more second reference signals of the second RAT may comprise a cell specific reference signal (CRS).

In an example, the wireless device may receive one or more first configuration parameters and may determine the first pattern based on the one or more first configuration parameters. In an example, the one or more first configuration parameters may be wireless device specific parameters. In an example, the one or more first configuration parameters may comprise RRC parameters. In an example, the one or more first configuration parameters may comprise broadcast parameters (e.g., received via a broadcast message, e.g., a SIB or MIB).

In an example, the one or more first configuration parameters may be associated with a first CORESET/search space. The first pattern may be applicable for the first reference signal associated with a downlink control channel received via the first CORESET/search space. In an example, the wireless device may further receive one or more second configuration parameters of a second CORESET/search space. The wireless device may determine a second pattern (e.g., a second pattern different from the first pattern) of the first reference signal associated with downlink control channel received via/based on the second CORESET/search space.

The wireless device may receive a downlink control information via the downlink control channel. The wireless device may receive the downlink control information via the downlink control channel based on the determination. The wireless device may receive the downlink control channel (e.g., PDCCH) based on a second RAT (e.g., using the physical layer of the second RAT, e.g., a NR RAT). The downlink control information may be a scheduling DCI and may comprise scheduling information for a downlink or an uplink transmission.

Figure 20:
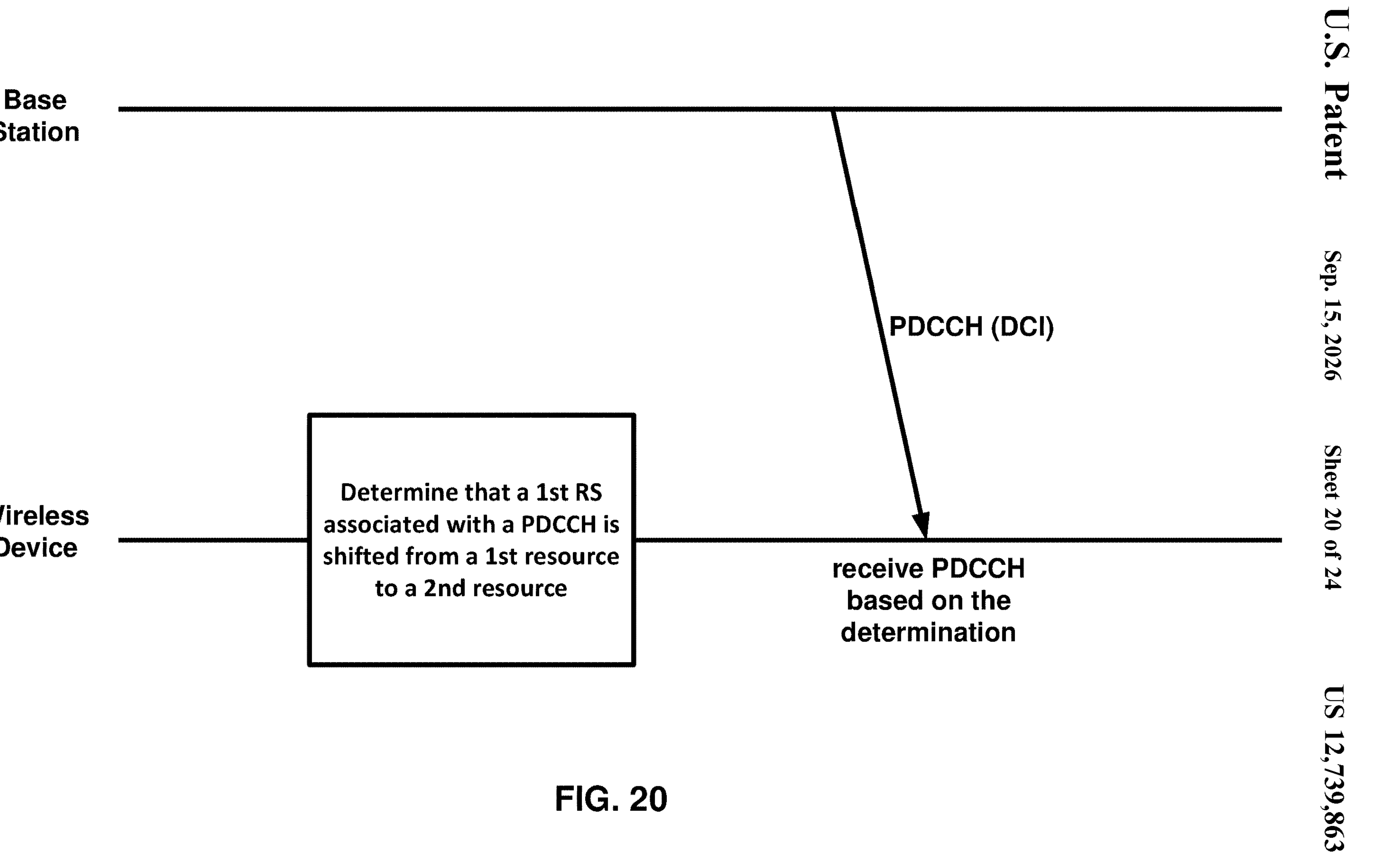
FIG. 20 shows an example process in accordance with several of various embodiments of the present disclosure.

In an example embodiment as shown in FIG. 20, a wireless device may determine that a first reference signal (e.g., DMRS) that is associated with a downlink control channel is shifted/moved from a first resource (e.g., a first RE) to a second resource (e.g., a second RE). In an example, the wireless device may make the determination in response to an overlap of the first reference signal (e.g., prior to shifting/determining to shift) of the first reference signal with one or more second reference signals of first RAT (e.g., an LTE RAT). The one or more second reference signals may comprise a CRS. In an example, the shift may be a frequency domain shift (e.g., the second resource may be in the same symbol as the first resource and shifted to a new subcarrier) or may be a time domain shift (e.g., the second resource may be shifted to a new symbol and may be in the same subcarrier) or may be a combination of a time domain shift and frequency domain shift (e.g., the second resource may be shifted to a new symbol and a new subcarrier).

In an example, the wireless device may receive one or more configuration parameters and may make the determination based on the one or more configuration parameters. In an example, the one or more configuration parameters may be wireless device specific parameters. In an example, the one or more configuration parameters may comprise RRC parameters. In an example, the one or more configuration parameters may comprise broadcast parameters (e.g., received via a broadcast message, e.g., a SIB or MIB). In an example, the one or more configuration parameters may be associated with a CORESET/search space. In an example, the one or more configuration parameters may belong to a CORESET configuration or a search space configuration. In an example, the one or more configuration parameters may comprise a first parameter indicating an identifier of the CORESET/search space.

In an example, the wireless device may receive a MAC CE and may make the determination based on the MAC CE, e.g., based on value(s) of field(s) of the MAC CE. The MAC CE may indicate (e.g., a value of a field of the MAC CE) an identifier of a CORESET/search space indicating which CORESET/search space the MAC CE applies to. The wireless device may receive the downlink control channel based on the CORESET/ search space.

The wireless device may receive a downlink control information via the downlink control channel. The wireless device may receive the downlink control information via the downlink control channel based on the determination. The downlink control information may be a scheduling DCI and may comprise scheduling information for a downlink or an uplink transmission.

In an example embodiment as shown in FIG. 21, a wireless device may determine that a first reference signal (e.g., DMRS), associated with a downlink control channel (e.g., PDCCH), overlaps in one or more first resources, with a second reference signal (e.g., CRS) associated with a first RAT (e.g., LTE). The first reference signal may be used in receiving/decoding the downlink control channel (e.g., DCI received via the downlink control channel). The wireless device may further determine (e.g., in response to the determination of the overlap) one or more second/additional/new resources (e.g., REs) for the first reference signal.

In an example, the wireless device may receive one or more configuration parameters and at least one of the determination of the overlap and the determination of the second/additional/new resources (e.g., REs) may be based on the one or more configuration parameters. The one or more configuration parameters may comprise RRC parameter. In an example, the one or more configuration parameters may comprise CORESET configuration parameters associated with a CORESET. In an example, the one or more configuration parameters may comprise a first parameter indicating an identifier of the CORESET. In an example, the one or more configuration parameters may comprise one or more broadcast parameters (e.g., received via a broadcast message, e.g., a MIB or a SIB).

In an example, the wireless device may receive a MAC CE and at least one of the determination of the overlap and the determination of the second/additional/new resources (e.g., REs) may be based on the based on the MAC CE, e.g., based on value(s) of field(s) of the MAC CE. The MAC CE may indicate (e.g., a value of a field of the MAC CE) an identifier of a CORESET/search space indicating which CORESET/search space the MAC CE applies to. The wireless device may receive the downlink control channel based on the CORESET/search space.

The wireless device may receive a downlink control information via the downlink control channel. The wireless device may receive the downlink control information via the downlink control channel based on the determination. The wireless device may receive the downlink control channel (e.g., PDCCH) based on the second RAT (e.g., using the physical layer of the second RAT, e.g., the NR RAT). The downlink control information may be a scheduling DCI and may comprise scheduling information for a downlink or an uplink transmission.

Figure 22:
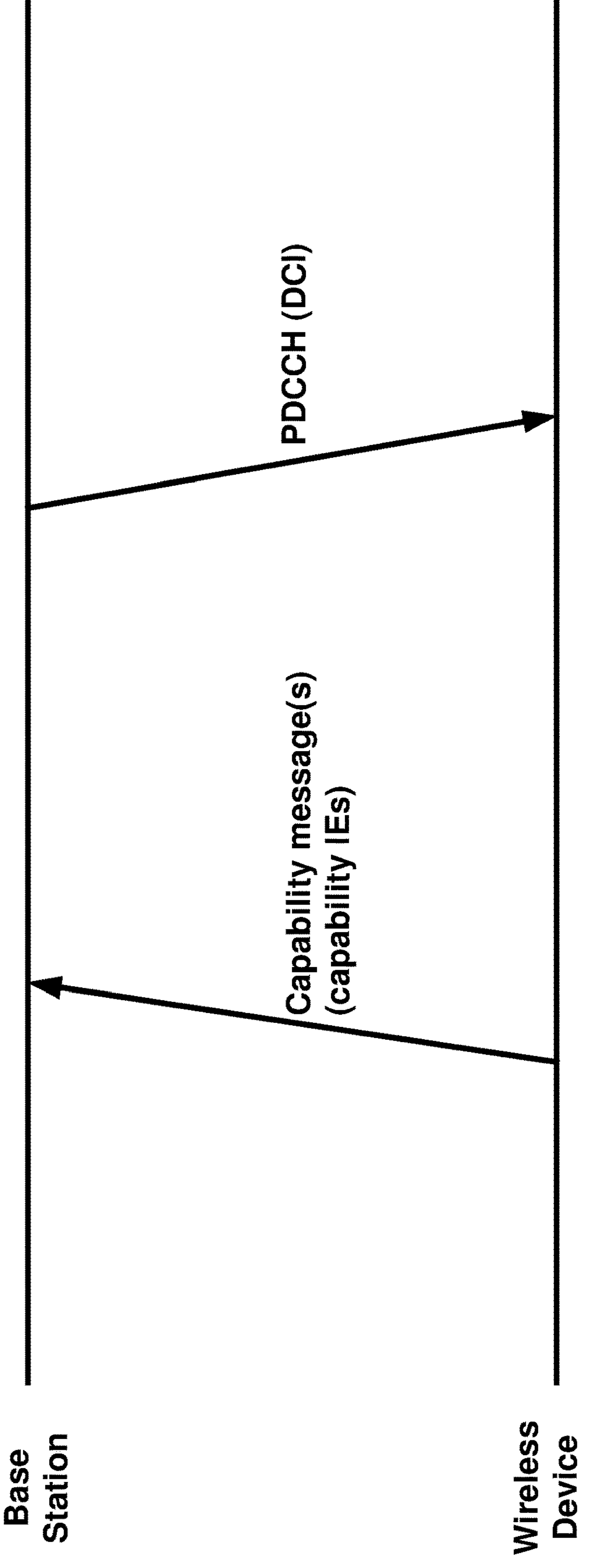
FIG. 22 shows an example process in accordance with several of various embodiments of the present disclosure.

In an example embodiment as shown in FIG. 22, a wireless device may transmit one or more capability messages to a base station. The one or more capability messages may comprise one or more capability IEs. The one or more capability IEs may be associated with a downlink control channel reception. The wireless device may receive a downlink control channel. In an example, the wireless device may receive the downlink control channel based on the one or more capability IEs. For example, the wireless device may receive one or more configuration parameters in response to transmitting the one or more capability messages, wherein the one or more configuration parameters may be based on the one or more capability IEs. The wireless device may receive the downlink control channel based on the one or more configuration parameters.

In an example, the one or more capability information elements may indicate whether the wireless device is capable of receiving a downlink control channel (e.g., PDCCH), wherein a reference signal (e.g., CRS) of/associated with a first radio access technology (RAT) (e.g., an LTE RAT) punctures one or more resources (e.g., one or more REs/RBs) of the downlink control channel (e.g., PDCCH).

In an example, the one or more capability information elements may indicate whether the wireless device is capable of receiving a downlink control channel (e.g., PDCCH), wherein resources (e.g., REs) associated with the reference signal (e.g., CRS) of/associated with a first RAT (e.g., an LTE RAT) are used for transmission of the downlink control channel.

In an example, the one or more capability information elements may indicate whether the wireless device is capable of receiving a downlink control channel (e.g., PDCCH), wherein a rate matching around the reference signal (CRS) of the first RAT (e.g., an LTE RAT) is used for transmission of the downlink control channel.

In an example, the one or more information elements may indicate whether the wireless device is capable of receiving a downlink control channel (e.g., PDCCH), wherein a reference signal (e.g., CRS) of/associated with a first RAT (e.g., an LTE RAT) punctures a downlink control channel (e.g., PDCCH) in one or more first resources (e.g., one or more first REs) and a rate matching around the reference signal of the first RAT in one or more second resources (e.g., one or more second REs) is used for transmission of the downlink control channel.

In an example, the one or more information elements may indicate whether the wireless device is capable a first pattern of a first reference signal (e.g., DMRS), e.g., associated with downlink control channel (e.g., PDCCH) reception, that enables avoiding resources associated with one or more second reference signals (e.g., CRS) of a RAT (e.g., an LTE RAT).

In an example, the one or more information elements may indicate whether the wireless device is capable of receiving a downlink control channel (e.g., PDCCH), wherein a first reference signal (e.g., DMRS) associated with the downlink control channel is shifted from a first resource (e.g., from a first RE) to a second resource (e.g., a second RE).

In an example, the one or more information elements may indicate whether the wireless device is capable of receiving a first reference signal (e.g., DMRS), associated with a downlink control channel (e.g., PDCCH), in one or more second/additional/new resources in response to the first reference signal overlapping with a second reference signal (e.g., CRS) associated with the second RAT in one or more first resources.

In an example embodiment, a wireless device may determine whether a reference signal (RS) of/associated with a first radio access technology (RAT) punctures (e.g., whether the RS punctures radio resources (e.g., resource element(s) (RE(s))/resource block(s) (RB(s))) of a downlink control channel (e.g., PDCCH) of a second RAT and/or resource(s) (e.g., RE(s)) associated with the reference signal of/associated with the first RAT are used for transmission of the downlink control channel of the second RAT or whether a rate matching around the reference signal of the first RAT is used for transmission of the downlink control channel. The wireless device may receive downlink control information via the downlink control channel based on the determination.

In an example, the wireless device may receive the downlink control channel based on the second RAT.

In an example, the first RAT may be a long-term evolution (LTE) RAT.

In an example, the second RAT may be new radio (NR) RAT.

In an example, the reference signal of the first RAT may be a cell-specific reference signal (CRS).

In an example, the downlink control information (DCI) may be a scheduling DCI and may comprise scheduling information (e.g., radio resources, HARQ related information, etc.) for an uplink transmission or a downlink transmission.

In an example, the wireless device may receive one or more configuration parameters and the determining, by the wireless device, may be based on the one or more configuration parameters. In an example, the one or more configuration parameters may comprise one or more radio resource control (RRC) parameters. In an example, the one or more RRC parameters may comprise control resource set (CORESET) configuration parameters and/or search space configuration parameters. In an example, the one or more RRC parameters may comprise a first parameter indicating an identifier of the CORESET or an identifier of the search space. In an example, the determination, by the wireless device, may be for/apply to downlink control channel received via the CORESET and/or based on the search space. In an example, the one or more configuration parameters may comprise one or more broadcast parameters. In an example, receiving the one or more broadcast parameters may be based on a broadcast message. In an example, the broadcast message may be a system information bock (SIB) message. In an example, the broadcast message may be a master information block (MIB) message.

In an example, the wireless device may receive a medium access control (MAC) control element (CE) and the determining, by the wireless device, may be based on the MAC CE. The MAC CE may indicate (e.g., comprises a field with a value indicating) an identifier of a control resource set (CORESET). The MAC CE may apply to the CORESET. The receiving the downlink control information may be based on the CORESET.

In an example embodiment, a wireless device may determine that a reference signal (RS) of/associated with a first radio access technology (RAT) punctures (e.g., that the RS punctures radio resources (e.g., resource element(s) (RE(s))/resource block(s) (RB(s))) of a downlink control channel (e.g., PDCCH) received via a first control resource set (CORESET)) and/or that resources (e.g., REs) associated with the reference signal of/associated with the first RAT are used for transmission of the downlink control channel via the first CORESET. The wireless device may receive the downlink control channel via the first CORESET based on the determination.

In an example, the wireless device may receive the downlink control channel based on a second RAT.

In an example, the first RAT may be a long-term evolution (LTE) RAT.

In an example, the second RAT may be new radio (NR) RAT.

In an example, the reference signal may be a cell-specific reference signal (CRS).

In an example, downlink control information (DCI), received via the downlink control channel, may be a scheduling DCI and may comprise scheduling information for an uplink transmission or a downlink transmission.

In an example, the wireless device may receive one or more first configuration parameters and the determining, by the wireless device, may be based on the one or more first configuration parameters. In an example, the one or more first configuration parameters may comprise one or more first radio resource control (RRC) parameters. In an example, the one or more first RRC parameters may belong to control resource set (CORESET) configuration associated with the first CORESET. In an example, the one or more first RRC parameters may comprise a first parameter indicating an identifier of the first CORESET. In an example, the determination, by the wireless device, may be for/apply to downlink control channel received via the first CORESET. In an example, the one or more first configuration parameters may comprise one or more first broadcast parameters. In an example, receiving the one or more first broadcast parameters may be based on a broadcast message. In an example, the broadcast message may be a system information bock (SIB) message. In an example, the broadcast message may be a master information block (MIB) message.

In an example, the wireless device may receive a first medium access control (MAC) control element (CE) and the determining, by the wireless device, may be based on the first MAC CE. The first MAC CE may indicate (e.g., comprises a field with a value indicating) an identifier of a first control resource set (CORESET). The first MAC CE may apply to the first CORESET. The receiving the downlink control information may be based on the first CORESET.

In an example, the wireless device may second determine that a reference signal (RS) of/associated with a first radio access technology (RAT) does not puncture (e.g., that the RS does not puncture radio resources (e.g., resource element(s) (RE(s))/resource block(s) (RB(s))) of a downlink control channel (e.g., PDCCH) received via a second control resource set (CORESET)) and/or that resources (e.g., REs) associated with the reference signal of/associated with the first RAT are not used for transmission of the downlink control channel via the second CORESET. The wireless device may receive the downlink control channel via the second CORESET based on the determination.

In an example, the wireless device may receive one or more second configuration parameters and the second determination may be based on the one or more second configuration parameters. In an example, the one or more second configuration parameters may belong to CORESET configuration parameters associated with the second CORESET. In an example, the CORESET configuration parameters may comprise a CORESET identifier parameter indicating a second identifier of the second CORESET. In an example, the one or more second configuration parameters may comprise one or more second broadcast parameters. In an example, receiving the one or more second broadcast parameters may be based on a broadcast message. In an example, the broadcast message may be a system information bock (SIB) message. In an example, the broadcast message may be a master information block (MIB) message.

In an example, the wireless device may receive a MAC CE and the second determination may be based on the MAC CE. In an example, the MAC CE may indicate (e.g., may comprise a field with a value indicating) an identifier of a second CORESET. The MAC CE may apply to the second CORESET. The receiving the downlink control information may be based on the second CORESET.

In an example embodiment, the wireless device may first determine that a reference signal (RS) of/associated with a first radio access technology (RAT) punctures (e.g., the RS punctures radio resources (e.g., resource element(s) (RE(s))/resource block(s) (RB(s))) of a downlink control channel (e.g., PDCCH) of a second RAT in one or more first resources (e.g., REs) and/or that one or more first resources (e.g., REs) associated with the reference signal of/associated with the first RAT are used for transmission of the downlink control channel of the second RAT. The wireless device may second determine that a rate matching around the reference signal of the first RAT in one or more second resources (e.g., REs) is used for transmission of the downlink control channel. The wireless device may receive downlink control information via the downlink control channel based on the first determination and the second determination.

In an example, the wireless device may receive the downlink control channel based on the second RAT.

In an example, the first RAT may be a long-term evolution (LTE) RAT.

In an example, the second RAT may be new radio (NR) RAT.

In an example, the reference signal may be a cell-specific reference signal (CRS).

In an example, the downlink control information (DCI) may be a scheduling DCI and may comprise scheduling information for an uplink transmission or a downlink transmission.

In an example, the wireless device may receive one or more configuration parameters and the determining, by the wireless device, may be based on the one or more configuration parameters. In an example, the one or more configuration parameters may comprise one or more radio resource control (RRC) parameters. In an example, the one or more RRC parameters may comprise control resource set (CORESET) configuration parameters and/or search space configuration parameters. In an example, the one or more RRC parameters may comprise a first parameter indicating an identifier of the CORESET or an identifier of the search space. In an example, the determination, by the wireless device, may be for/apply to downlink control channel received via the CORESET. In an example, the one or more configuration parameters may comprise one or more broadcast parameters. In an example, receiving the one or more broadcast parameters may be based on a broadcast message. In an example, the broadcast message may be a system information bock (SIB) message. In an example, the broadcast message may be a master information block (MIB) message.

In an example, the wireless device may receive a medium access control (MAC) control element (CE) and the determining, by the wireless device, may be based on the MAC CE. The MAC CE may indicate (e.g., comprises a field with a value indicating) an identifier of a control resource set (CORESET). The MAC CE may apply to the CORESET. The receiving the downlink control information may be based on the CORESET.

In an example embodiment, a wireless device may determine a first pattern of a first reference signal, associated with/of a first radio access technology (RAT), that enables avoiding resources associated with/of one or more second reference signals of a second RAT. The wireless device may receive downlink control information via a downlink control channel based on the determination.

In an example, the first reference signal may be a demodulation reference signal (DMRS).

In an example, the one or more second reference signals may comprise a cell specific reference signal (CRS).

In an example, the wireless device may receive one or more first configuration parameters and the determining the first pattern may be based on the one or more first configuration parameters. In an example, the first configuration parameters may be of a first control resource set (CORESET). In an example, the first pattern of the first reference signal may be associated with downlink control channel reception via a first CORESET. In an example, the wireless device may receive one or more second configuration parameters (e.g., of a second CORESET) indicating a second pattern of the first reference signal. In an example, the second pattern may be associated with downlink control channel reception via the second CORESET.

In an example, the first RAT may be a new radio (NR) RAT.

In an example, the second RAT may be a long-term evolution (LTE) RAT.

In an example embodiment, a wireless device may determine that a first reference signal associated with a downlink control channel is shifted from a first resource (e.g., a first RE) to a second resource (e.g., a second RE). The wireless device may receive downlink control information via the downlink control channel based on the determination.

In an example, the first reference signal may be a demodulation reference signal (DMRS).

In an example, the determining may be in response to the first reference signal overlapping with one or more second reference signals of a first radio access technology (RAT). In an example, the first RAT may be a long-term evolution (LTE) RAT. In an example, the one or more second reference signals may comprise a cell-specific reference signal (CRS).

In an example, the wireless device may receive one or more configuration parameters and the determining may be based on the one or more configuration parameters. In an example, the one or more configuration parameters may comprise one or more radio resource control (RRC) parameters. In an example, the one or more RRC parameters may comprise control resource set (CORESET) and/or search space configuration parameters. In an example, the one or more RRC parameters may comprise a first parameter indicating an identifier of the CORESET or the search space. In an example, the one or more configuration parameters may comprise one or more broadcast parameters. In an example, receiving the one or more broadcast parameters may be based on a broadcast message. In an example, the broadcast message may be a system information bock (SIB) message. In an example, the broadcast message may be a master information block (MIB) message.

In an example, the wireless device may receive a medium access control (MAC) control element (CE) and the determining may be based on the MAC CE. In an example, the MAC CE may indicate (e.g., may comprise a field with a value indicating) an identifier of a control resource set (CORESET). The MAC CE may apply to the CORESET. The wireless device may receive the downlink control information is based on the CORESET.

In an example, the shift may be a frequency domain shift.

In an example, the shift may be in a first number of resource elements/blocks (REs/RBs).

In an example, the shift may be a time domain shift.

In an example, the shift may be in a first number of symbols.

In an example embodiment, a wireless device may first determine that a first reference signal, associated with a downlink control channel, overlaps in one or more first resources, with a second reference signal associated with a first radio access technology (RAT). The wireless device may second determine one or more second/ additional resources for the first reference signal. The wireless device may receive downlink control information via the downlink control channel based on the determination.

In an example, the second determining may be based on/ in response to the first reference signal overlapping with the second reference signal in the one or more first resources.

In an example, the first reference signal may be a demodulation reference signal (DMRS).

In an example, the first RAT may be a long-term evolution (LTE) RAT.

In an example, the second reference signal may be a cell-specific reference signal (CRS).

In an example, the first reference signal may be used in receiving the downlink control channel.

In an example, the wireless device may receive one or more configuration parameters (e.g., RRC parameters) and at least one of the first determining and the second determining may be based on the one or more configuration parameters.

In an example, the one or more RRC parameters may comprise control resource set (CORESET) configuration parameters and/or search space configuration parameters. In an example, the one or more RRC parameters may comprise a first parameter indicating an identifier of the CORESET or an identifier of the search space. In an example, at least one of the first determination and the second determination, by the wireless device, may be for/apply to downlink control channel received via the CORESET. In an example, the one or more configuration parameters may comprise one or more broadcast parameters. In an example, receiving the one or more broadcast parameters may be based on a broadcast message. In an example, the broadcast message may be a system information bock (SIB) message. In an example, the broadcast message may be a master information block (MIB) message.

In an example, the wireless device may receive a medium access control (MAC) control element (CE) and at least one of the first determination and the second determination, by the wireless device, may be based on the MAC CE. The MAC CE may indicate (e.g., comprises a field with a value indicating) an identifier of a control resource set (CORESET). The MAC CE may apply to the CORESET. The receiving the downlink control information may be based on the CORESET.

In an example embodiment, a wireless device may transmit, to a base station, one or more capability messages comprising one or more capability information elements associated with reception of a downlink control channel. The wireless device may receive the downlink control channel.

In an example, the one or more capability information elements may indicate whether the wireless device is capable of receiving a downlink control channel, wherein a reference signal of/associated with a first radio access technology (RAT) punctures the downlink control channel, e.g., puncture one or more resources (e.g., one or more resource elements (REs)/one or more resource blocks (RBs)) of the downlink control channel. In an example, the first RAT may be a long-term evolution (LTE) RAT. In an example, the second RAT may be a new radio (NR) RAT. In an example, the reference signal may be a cell specific reference signal (CRS).

In an example, the one or more capability information elements may indicate whether the wireless device is capable of receiving a downlink control channel, wherein resources (e.g., REs) associated with the reference signal of/associated with the first RAT may be used for transmission of the downlink control channel. In an example, the first RAT may be a long-term evolution (LTE) RAT. In an example, the reference signal may be a cell specific reference signal (CRS).

In an example, the one or more capability information elements may indicate whether the wireless device is capable of receiving a downlink control channel, wherein a rate matching around the reference signal of the first RAT may be used for transmission of the downlink control channel. In an example, the first RAT may be a long-term evolution (LTE) RAT. In an example, the reference signal may be a cell specific reference signal (CRS).

In an example, the one or more capability information elements may indicate whether the wireless device is capable of receiving a downlink control channel, wherein a reference signal of/associated with a first RAT punctures (e.g., puncture resources, e.g., RE(s)/RB(s)) of a downlink control channel in one or more first resources (e.g., RE(s)/RB(s)) and a rate matching around the reference signal of the first RAT in one or more second resources (e.g., RE(s)/RB(s)) may be used for transmission of the downlink control channel. In an example, the first RAT may be a long-term evolution (LTE) RAT. In an example, the reference signal may be a cell specific reference signal (CRS).

In an example, the one or more capability information elements may indicate whether the wireless device is capable of a first pattern of a first reference signal that enables avoiding resources associated with one or more second reference signals of a RAT. In an example, the first reference signal may be a DMRS. In an example, the one or more second reference signals may comprise a cell-specific reference signal (CRS). In an example, the RAT may be a long-term evolution (LTE) RAT.

In an example, the one or more capability information elements may indicate whether the wireless device is capable of receiving a downlink control channel, wherein a first reference signal associated with the downlink control channel may be shifted from a first resource (e.g., from a first RE) to a second resource (e.g., a second RE). In an example, the first reference signal may be a demodulation reference signal (DMRS).

In an example, the one or more capability information elements may indicate whether the wireless device is capable of receiving a first reference signal, associated with a downlink control channel, in one or more additional resources in response to the first reference signal overlapping with a second reference signal associated with the RAT in one or more first resources. In an example, the first reference signal may be a demodulation reference signal (DMRS). In an example, the second reference signal may be a cell-specific reference signal (CRS). In an example, the RAT may be a long-term evolution (LTE) RAT.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

FIG. 23 shows an example flow diagram in accordance with several of various embodiments of the present disclosure. At 2310, a wireless device may transmit a capability message comprising at least one capability information element indicating that the wireless device supports reception of a downlink control channel, of a second radio access technology, in one or more resource elements associated with a reference signal of a first radio access technology. At 2320, the wireless device may receive, in response to transmitting the capability message, the downlink control channel in the one or more resource elements associated with the reference signal.

In an example embodiment, the second radio access technology may be New Radio (NR).

In an example embodiment, the first radio access technology may be Long Term Evolution (LTE).

In an example embodiment, the first reference signal may be a cell specific reference signal (CRS).

In an example embodiment, the wireless device may determine downlink control information in response to receiving the downlink control channel at 2320. In an example embodiment, the downlink control information may comprise scheduling information for an uplink transmission or a downlink transmission.

In an example embodiment, at least one resource element of the one or more resource elements, in which the downlink control channel is received at 2320, may be associated with a second reference signal of the second radio access technology. In an example embodiment, the second reference signal may be demodulation reference signal (DMRS).

In an example embodiment, the wireless device may receive configuration parameters in response to/based on the one or more capability information elements transmitted at 2310. In an example embodiment, the receiving the downlink control channel, at 2320, may be based on the configuration parameters. In an example embodiment, the configuration parameters may comprise at least one configuration parameter indicating/enabling receiving/reception the downlink control channel, of the second radio access technology, in the one or more resource elements associated with the reference signal of the first radio access technology. In an example embodiment, the wireless device may determine, based on the at least one configuration parameter, that reception of the downlink control channel in the one or more resource elements is enabled. In an example embodiment, the receiving the configuration parameters may be via/based on the second radio access technology.

FIG. 24 shows an example flow diagram in accordance with several of various embodiments of the present disclosure. At 2410, a wireless device may receive at least one configuration parameter indicating/enabling receiving a downlink control channel, of a second radio access technology, in one or more resource elements associated with a first reference signal of a first radio access technology. At 2420, the wireless device may receive, based on the at least one configuration parameter and in/using the one or more first resource elements of the first reference signal, the downlink control channel associated with the second radio access technology.

In an example embodiment, the second radio access technology may be New Radio (NR).

In an example embodiment, the first radio access technology may be Long Term Evolution (LTE).

In an example embodiment, the first reference signal may be a cell specific reference signal (CRS).

In an example embodiment, the wireless device may determine, based on the at least one configuration parameter received at 2410, that reception of the downlink control channel in/using the one or more first symbols is enabled.

In an example embodiment, the wireless device may determine, based on the at least one configuration parameter received at 2410, that reception of the downlink control channel in/using the one or more first symbols is enabled.

In an example embodiment, the wireless device may determine downlink control information based on/in response to receiving the downlink control channel at 2420. In an example embodiment, the downlink control information may comprise scheduling information for an uplink transmission or a downlink transmission.

In an example embodiment, the wireless device may transmit a capability message comprising at least one capability information element indicating that the wireless device supports reception of a downlink control channel, of the second radio access technology, in/using one or more resource elements associated with the reference signal of the first radio access technology. In an example embodiment, the receiving the at least one configuration parameter, at 2410, may be in response to transmitting the capability message.

In an example embodiment, the receiving the at least one configuration parameter, at 2410, may be via the second radio access technology.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:

transmitting, by a wireless device, a capability message comprising at least one capability information element indicating that the wireless device supports reception of a downlink control channel, of a second radio access technology, in one or more resource elements associated with a reference signal of a first radio access technology; and receiving, in response to transmitting the capability message, the downlink control channel in the one or more resource elements associated with the reference signal.

2. The method of claim 1, wherein the second radio access technology is New Radio (NR).

3. The method of claim 1, wherein the first radio access technology is Long Term Evolution (LTE).

4. The method of claim 1, wherein the first reference signal is a cell specific reference signal (CRS).

5. The method of claim 1, further comprising determining downlink control information in response to receiving the downlink control channel.

6. The method of claim 5, wherein the downlink control information comprises scheduling information for an uplink transmission or a downlink transmission.

7. The method of claim 1, wherein at least one resource element of the one or more resource elements is associated with a second reference signal of the second radio access technology.

8. A wireless device comprising:

one or more processors; and memory storing instructions that, when executed by the one or more processors, cause the wireless device to:

transmit a capability message comprising at least one capability information element indicating that the wireless device supports reception of a downlink control channel, of a second radio access technology, in one or more resource elements associated with a reference signal of a first radio access technology; and receive, in response to transmitting the capability message, the downlink control channel in the one or more resource elements associated with the reference signal.

9. The wireless device of claim 8, wherein the second radio access technology is New Radio (NR).

10. The wireless device of claim 8, wherein the first radio access technology is Long Term Evolution (LTE).

11. The wireless device of claim 8, wherein the first reference signal is a cell specific reference signal (CRS).

12. The wireless device of claim 8, wherein the instructions, when executed by the one or more processors, further cause the wireless device to determine downlink control information, comprising scheduling information for an uplink transmission or a downlink transmission, in response to receiving the downlink control channel.

13. The wireless device of claim 8, wherein at least one resource element of the one or more resource elements is associated with a second reference signal of the second radio access technology.

14. A system comprising:

a base station; and a wireless device comprising: one or more processors; and memory storing instructions that, when executed by the one or more processors, cause the wireless device to: transmit, to the base station, a capability message comprising at least one capability information element indicating that the wireless device supports reception of a downlink control channel, of a second radio access technology, in one or more resource elements associated with a reference signal of a first radio access technology;

and receive, in response to transmitting the capability message, the downlink control channel in the one or more resource elements associated with the reference signal.

15. The system of claim 14, wherein the second radio access technology is New Radio (NR).

16. The system of claim 15, wherein the first radio access technology is Long Term Evolution (LTE).

17. The system of claim 15, wherein the first reference signal is a cell specific reference signal (CRS).

18. The system of claim 15, wherein the instructions, when executed by the one or more processors, further cause the wireless device to determine downlink control information in response to receiving the downlink control channel.

19. The system of claim 18, wherein the downlink control information comprises scheduling information for an uplink transmission or a downlink transmission.

20. The system of claim 15, wherein at least one resource element of the one or more resource elements is associated with a second reference signal of the second radio access technology.

* * * * *